(12) United States Patent
Suzuki et al.

(10) Patent No.: US 9,749,672 B2
(45) Date of Patent: Aug. 29, 2017

(54) STORAGE MEDIUM STORING INFORMATION PROCESSING PROGRAM, INFORMATION PROCESSING DEVICE, INFORMATION PROCESSING SYSTEM, AND PANORAMIC VIDEO DISPLAY METHOD

(71) Applicants: Toshiaki Suzuki, Kyoto (JP); Shigefumi Kawase, Tokyo (JP)

(72) Inventors: Toshiaki Suzuki, Kyoto (JP); Shigefumi Kawase, Tokyo (JP)

(73) Assignees: Nintendo Co., Ltd., Kyoto (JP); Hal Laboratory, Inc., Toyko (JP)

( * ) Notice: Subject to any disclaimer, the term of this patent is extended or adjusted under 35 U.S.C. 154(b) by 0 days.

(21) Appl. No.: 15/245,451

(22) Filed: Aug. 24, 2016

(65) Prior Publication Data

US 2016/0366460 A1 Dec. 15, 2016

Related U.S. Application Data

(63) Continuation of application No. 13/869,401, filed on Apr. 24, 2013, now Pat. No. 9,485,484.

(30) Foreign Application Priority Data

Jun. 1, 2012 (JP) .................................. 2012-125644

(51) Int. Cl.
*H04N 5/76* (2006.01)
*H04N 21/41* (2011.01)
(Continued)

(52) U.S. Cl.
CPC ....... *H04N 21/4122* (2013.01); *G11B 27/005* (2013.01); *G11B 27/322* (2013.01);
(Continued)

(58) Field of Classification Search
None
See application file for complete search history.

(56) References Cited

U.S. PATENT DOCUMENTS

2004/0105597 A1 6/2004 Lelescu et al.
2005/0187015 A1* 8/2005 Suzuki .................... A63F 13/10
463/32
(Continued)

FOREIGN PATENT DOCUMENTS

JP H08-229238 9/1996
JP 2002-320215 10/2002
(Continued)

OTHER PUBLICATIONS

Office Action in U.S. Appl. No. 13/869,466 dated Dec. 19, 2013, 24 pages.
(Continued)

*Primary Examiner* — Eileen Adams
(74) *Attorney, Agent, or Firm* — Nixon & Vanderhye, P.C.

(57) ABSTRACT

An example information processing device displays a partial area of a panoramic video on a display device. The information processing device obtains range information with which it is possible to identify a display range of the panoramic video to be displayed and/or to identify a position within the display range. The obtained range information is information regarding a display range determined based on an input made on a predetermined input device while the panoramic video is played. Where the panoramic video is output using the display device, the information processing device outputs the panoramic video while changing output content thereof in accordance with the obtained range information.

22 Claims, 22 Drawing Sheets

(51) Int. Cl.
*H04N 9/87* (2006.01)
*H04N 5/445* (2011.01)
*H04N 21/414* (2011.01)
*H04N 21/4728* (2011.01)
*H04N 21/6587* (2011.01)
*G11B 27/32* (2006.01)
*G11B 27/00* (2006.01)

(52) U.S. Cl.
CPC ......... *H04N 5/44591* (2013.01); *H04N 5/76* (2013.01); *H04N 9/87* (2013.01); *H04N 21/41407* (2013.01); *H04N 21/4728* (2013.01); *H04N 21/6587* (2013.01); *H04N 2005/44578* (2013.01)

(56) References Cited

U.S. PATENT DOCUMENTS

| | | | |
|---|---|---|---|
| 2007/0268369 A1* | 11/2007 | Amano | H04N 7/18 348/207.99 |
| 2007/0273558 A1 | 11/2007 | Smith et al. | |
| 2008/0159652 A1 | 7/2008 | Shimizu | |
| 2009/0002394 A1 | 1/2009 | Chen et al. | |
| 2009/0158307 A1 | 6/2009 | Kashitani | |
| 2010/0292011 A1* | 11/2010 | Kira | A63F 13/533 463/43 |
| 2011/0096144 A1 | 4/2011 | Pea et al. | |
| 2011/0141141 A1 | 6/2011 | Kankainen | |
| 2011/0216159 A1 | 9/2011 | Yoshizumi | |
| 2011/0216179 A1 | 9/2011 | Dialameh et al. | |
| 2011/0273470 A1 | 11/2011 | Ohba et al. | |
| 2011/0285704 A1 | 11/2011 | Takeda et al. | |
| 2012/0060177 A1 | 3/2012 | Stinson, III et al. | |
| 2012/0119992 A1 | 5/2012 | Nishida et al. | |
| 2013/0322845 A1 | 12/2013 | Suzuki et al. | |

FOREIGN PATENT DOCUMENTS

| | | |
|---|---|---|
| JP | 2003-283981 | 10/2003 |
| JP | 2004-187298 | 7/2004 |
| JP | 2005-295266 | 10/2005 |
| JP | 2010-531007 | 9/2010 |
| JP | 2012-108722 | 6/2012 |
| WO | WO 2008/147561 | 12/2008 |
| WO | WO 2011/148034 A1 | 12/2011 |

OTHER PUBLICATIONS

Office Action issued in co-pending U.S. Appl. No. 13/869,466 dated May 16, 2014, 24 pages.
Notice of Reasons for Refusal in corresponding Japanese Patent Application No. 2012-125644 dated Jan. 27, 2016.
Japanese Office Action issued in corresponding JP Patent Appln. No. 2012-125642 dated Feb. 19, 2016.
Japanese Office Action (Notice of Reasons for Refusal) issued in corresponding JP Patent Appln. No. 2012-125643 dated Mar. 29, 2016.
European Search Report dated Mar. 7, 2017 issued for corresponding European Patent Appln. No. 13165282.8.

* cited by examiner

F I G. 1
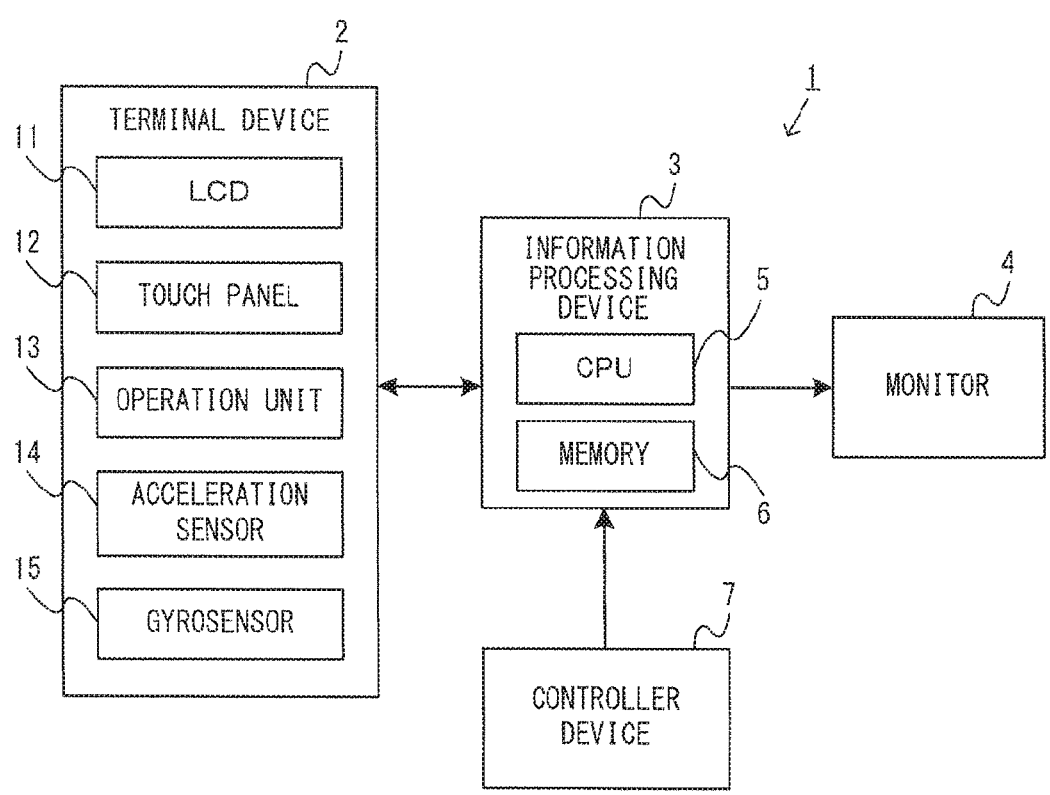

| ADDITIONAL INFORMATION | RANGE INFORMATION | TIME INFORMATION | USER INFORMATION |
|---|---|---|---|
| CONTENT OF COMMENT | VECTOR V | ith FRAME | USER A |

| TIME INFORMATION | RANGE INFORMATION | USER INFORMATION |
|---|---|---|
| FIRST FRAME | VECTOR V1 | USER A |
| SECOND FRAME | VECTOR V2 | |
| ⋮ | ⋮ | |
| nth FRAME | VECTOR Vn | |
| ⋮ | ⋮ | |

STORAGE MEDIUM STORING INFORMATION PROCESSING PROGRAM, INFORMATION PROCESSING DEVICE, INFORMATION PROCESSING SYSTEM, AND PANORAMIC VIDEO DISPLAY METHOD

CROSS REFERENCE TO RELATED APPLICATIONS

This application is a continuation of U.S. patent application Ser. No. 13/869,401 filed Apr. 24, 2013 which claims priority to Japanese Patent Application No. 2012-125644 filed on Jun. 1, 2012, the entire contents of each of which are incorporated herein by reference.

FIELD

The technology herein relates to a storage medium storing an information processing program, an information processing device, an information processing system, and a panoramic video display method for displaying a panoramic video on a display device.

BACKGROUND AND SUMMARY

There are conventional techniques for producing and displaying a panoramic image on a display device.

Conventional techniques merely display a panoramic image, and it has been desired to provide various information together with the panoramic image.

Thus, the present disclosure provides a storage medium storing an information processing program, an information processing device, an information processing system, and a video display method capable of presenting more information to the user when displaying a panoramic image.

(1)

An example storage medium described in the present specification stores an information processing program to be executed by a computer of an information processing device for displaying a partial area of a panoramic video on a display device. The information processing program instructs the computer to execute: obtaining range information; and outputting at least a part of the panoramic video.

The range information is information with which it is possible to identify a display range of the panoramic video to be displayed and/or to identify a position within the display range, and is information regarding a display range determined based on an input made on a predetermined input device while the panoramic video is played. The information processing device outputs at least a part of the panoramic video while changing output content thereof in accordance with the obtained range information.

With configuration (1) above, range information is obtained when a panoramic video is played. Then, at least a part of the panoramic video is output while changing the output content thereof in accordance with the obtained range information. Thus, the playback content from past instances of playback of the panoramic video or other instances of playback of the panoramic video on other devices can be presented to a user. For example, the playback content from past instances of playback of the panoramic video or other instances of playback of the panoramic video on other devices can be reflected in the output of the panoramic video currently played. Thus, with configuration (1) above, it is possible to present more information to a user while displaying a panoramic image.

(2)

The obtained range information may be stored in a storage unit as history information. Then, information based on the history information is output after the history information is stored.

With configuration (2) above, range information is stored as history information while displaying a panoramic image. Then, the panoramic video is output while changing the output content thereof in accordance with the obtained and stored history information. Thus, it is possible to output in accordance with the history information while playing a panoramic video. That is, it is possible not only to simply present a panoramic video, but also to present information interesting to a user together with a panoramic video.

(3)

The history information stored in the storage unit may be information in which time information is associated with range information, wherein it is possible with the time information to identify a playback time point in the panoramic video, and wherein it is possible with the range information to identify a display range at the playback time point and/or a position within the display range.

With configuration (3) above, by storing the time information and the range information, it is possible to store ranges of a panoramic image that have been looked at. Thus, for example, it is possible to later check which range or ranges of the image area of a panoramic video have been looked at.

(4)

The information processing program may instruct the computer to further execute determining the display range based on an input made on a predetermined input device. Then, a panoramic video of a display range determined based on the input made on the predetermined input device is displayed on the display device, and history-related information produced based on the history information is output.

With configuration (4) above, history-related information can be presented to a user while a panoramic video is played, and the user can know information regarding a history of another user.

(5)

The history-related information output together with the panoramic video may represent a direction of the display range identified by the range information included in the history information with respect to a current display range.

With configuration (5) above, as the history-related information representing a direction is presented, it is possible to present, to a user, where in a panoramic video another user was seeing, with respect to the current display range.

(6)

The output history-related information may represent a display frequency for a predetermined range in the panoramic video obtained from the history information.

With configuration (6) above, it is possible to present which locations in a panoramic video are much seen. Therefore, for example, a user can play a panoramic video while setting the display range to a range that is popular (much seen by other users) or while setting the display range to a range that is not much seen by other users.

(7)

The history-related information may represent a display frequency determined in accordance with the number of pieces of history information that satisfy a predetermined condition regarding the time information and the range information.

With configuration (7) above, it is possible to present which locations in a panoramic video have been much seen by other users over a plurality of instances of playback of a panoramic video.

(8)

The history-related information may represent a display frequency determined in accordance with the number of pieces of range information that satisfy a predetermined condition regarding a position on a panoramic image.

With configuration (8) above, it is possible to present which locations in a panoramic video have been much seen by other users over a single instance of a plurality of instances of playback of the panoramic video.

(9)

The panoramic video may be stored in the storage unit, which can be accessed by the information processing device, together with object information representing a position and/or a range of an object appearing in the panoramic video. Then, history-related information output together with the panoramic video may represent a display frequency of the object calculated based on the object information and the history information.

With configuration (9) above, it is possible to present, to a user, how much attention an object appearing in a panoramic video has been drawing.

(10)

When playback of the panoramic video is completed, a panoramic image of a display range determined based on the range information stored as the history information during the playback is displayed on the display device as a still image or a video.

With configuration (10) above, after completion of playback of a panoramic video, it is possible to present a history of the playback to a user.

(11)

Range information representing the display range and/or a position within the display range may be obtained as the history information. Then, the information processing program instructs the computer to further execute determining whether or not an object appearing in the panoramic video is included in a display range identified by the history information so as to select an object to be output based on a result of the determination. A panoramic image including the selected object therein is displayed on the display device as a still image or a video.

With configuration (11) above, after completion of playback of a panoramic video, it is possible to present, to a user, the degree by which an object appearing in the panoramic video has been displayed (whether it has been much seen or not).

(12)

The information processing program may instruct the computer to further execute determining whether or not an object is included within a display range during playback of the panoramic video so as to select an object to be output based on a result of the determination. Then, information representing the selected object is obtained as the range information. A panoramic image of a display range including therein the object represented by the range information is displayed on the display device as a still image or a video.

With configuration (12) above, as with configuration (11), after completion of playback of a panoramic video, it is possible to present, to a user, the degree by which an object appearing in the panoramic video has been displayed.

(13)

The history information stored in the storage unit may be information in which time information is associated with range information, wherein it is possible with the time information to identify a playback time point in the panoramic video, and wherein it is possible with the range information to identify a display range at the playback time point and/or a position within the display range. Then, a panoramic image of a display range determined based on a plurality of pieces of history information is displayed on the display device as a still image or a video.

With configuration (13) above, after completion of playback of a panoramic video, it is possible to present, to a user, which locations of the panoramic video have been much seen (or not seen), etc.

(14)

Range information regarding a panoramic video played on the display device may be obtained.

With configuration (14) above, it is possible to obtain range information from a past instance of playback on a display device on which a panoramic video is played while reflecting history information. Thus, for example, a user can check the playback content from a past instance of playback on the same display device.

(15)

Range information regarding a panoramic video played on another display device different from the display device may be obtained.

With configuration (15) above, it is possible to present the playback content on a display device different from the display device on which a panoramic video was played.

(16)

The information processing program may instruct the computer to further execute: determining the display range; and displaying the panoramic video of the determined display range on the other display device. The display range is determined based on an input made on the predetermined input device while the panoramic video is displayed on the display device. The panoramic video of the determined display range is displayed on the other display device while the panoramic video is displayed on the display device.

With configuration (16) above, a user can view the area of an intended display range in a panoramic video, and view the panoramic video in a manner of output such that the history information is reflected.

(17)

The information processing program may instruct the computer to further execute outputting the panoramic video on another display device different from the display device while the panoramic video is displayed on the display device by means of a first output control unit. Then, the range information is obtained when the panoramic video is played on the other display device. The panoramic video is displayed on the display device while changing output content thereof in accordance with the range information while the panoramic video is played on the other display device.

With configuration (17) above, a panoramic video is displayed on two display devices, wherein the playback content from one of the display devices is reflected in the output on the other display device. Therefore, where a plurality of users are seeing a single panoramic video at the same time, it is possible to present, together with the panoramic video, information interesting to a user, i.e., which locations of the panoramic video are seen by other users.

(18)

The information processing program may instruct the computer to further execute determining the display range based on an input on the predetermined input device while the panoramic video is displayed on the display device by means of a first output control unit. Then, a panoramic video of the determined display range is displayed on the other display device. A panoramic video of a predetermined range is displayed on the display device, and a panoramic video of a display range based on the range information is displayed on the display device.

With configuration (18) above, where a panoramic video is displayed on two display devices, a panoramic image of a display range on one of the display devices is also displayed on the other display device. Thus, also the user seeing the other display device can easily check the playback content from one of the display devices. For example, configuration (18) above is advantageous in cases where one of the display devices is a portable type (hand-held type) display device, and in similar cases.

(19)

A panoramic video of a display range determined based on the range information may be displayed on the display device.

With configuration (19) above, it is possible to play a panoramic video with the same display range as that from a past instance of playback (when history information was stored).

(20)

Range information regarding a panoramic video played on another display device different from the display device may be obtained. Then, the panoramic video is displayed on the display device while reducing a change in the display range determined based on the range information.

With configuration (20) above, it is possible to provide a panoramic video of the display range in an easy-to-view manner for a user who is not controlling the display range.

(21)

The obtained range information may represent a position specified by a user while the panoramic video is played. Then, an image representing a position on a panoramic image determined based on the range information is displayed on the display device together with the panoramic video.

With configuration (21) above, a position specified by a user during a separate instance of playback of a panoramic video can be presented to another user.

(22)

An image representing a viewing direction corresponding to a display range or a position based on the range information may be displayed on the display device.

With configuration (22) above, it is possible to present, to a user, which direction another user was facing during a separate instance of playback of a panoramic video.

(23)

An image representing a space represented by the panoramic video and a position in the space corresponding to a position on the panoramic video based on the range information may be displayed on the display device.

With configuration (23) above, the position represented by the range information can be expressed by an image as viewed from a different viewpoint from the panoramic video, and it is possible to present the position to a user in an easier-to-understand manner.

(24)

The range information may be obtained from an external device via a network.

With configuration (24) above, it is possible to present, to a user, information based on history information of another user.

(25)

User information representing a user who has made an input regarding the range information may be further obtained. Then, the user information is output when the panoramic video is output.

With configuration (25) above, it is possible to present, to a user, information indicating who is the user who was playing the panoramic video when the history information was stored.

Note that the present specification discloses an information processing device and an information processing system having units equivalent to those realized by executing the information processing program of configurations (1) to (25) above. The present specification also discloses a panoramic video display method to be carried out in configurations (1) to (25) above.

With the storage medium storing an information processing program, the information processing device, the information processing system, and the panoramic video display method described above, it is possible to present more information to a user when displaying a panoramic image by outputting a panoramic video while changing the output content thereof in accordance with range information that has been obtained in a separate instance of playback of the panoramic video.

These and other objects, features, aspects and advantages will become more apparent from the following detailed description when taken in conjunction with the accompanying drawings.

BRIEF DESCRIPTION OF THE DRAWINGS

FIG. 1 is a block diagram showing a non-limiting example information processing system according to the present embodiment;

DETAILED DESCRIPTION OF NON-LIMITING EXAMPLE EMBODIMENTS

1. Configuration of Information Processing System

Figure 2:
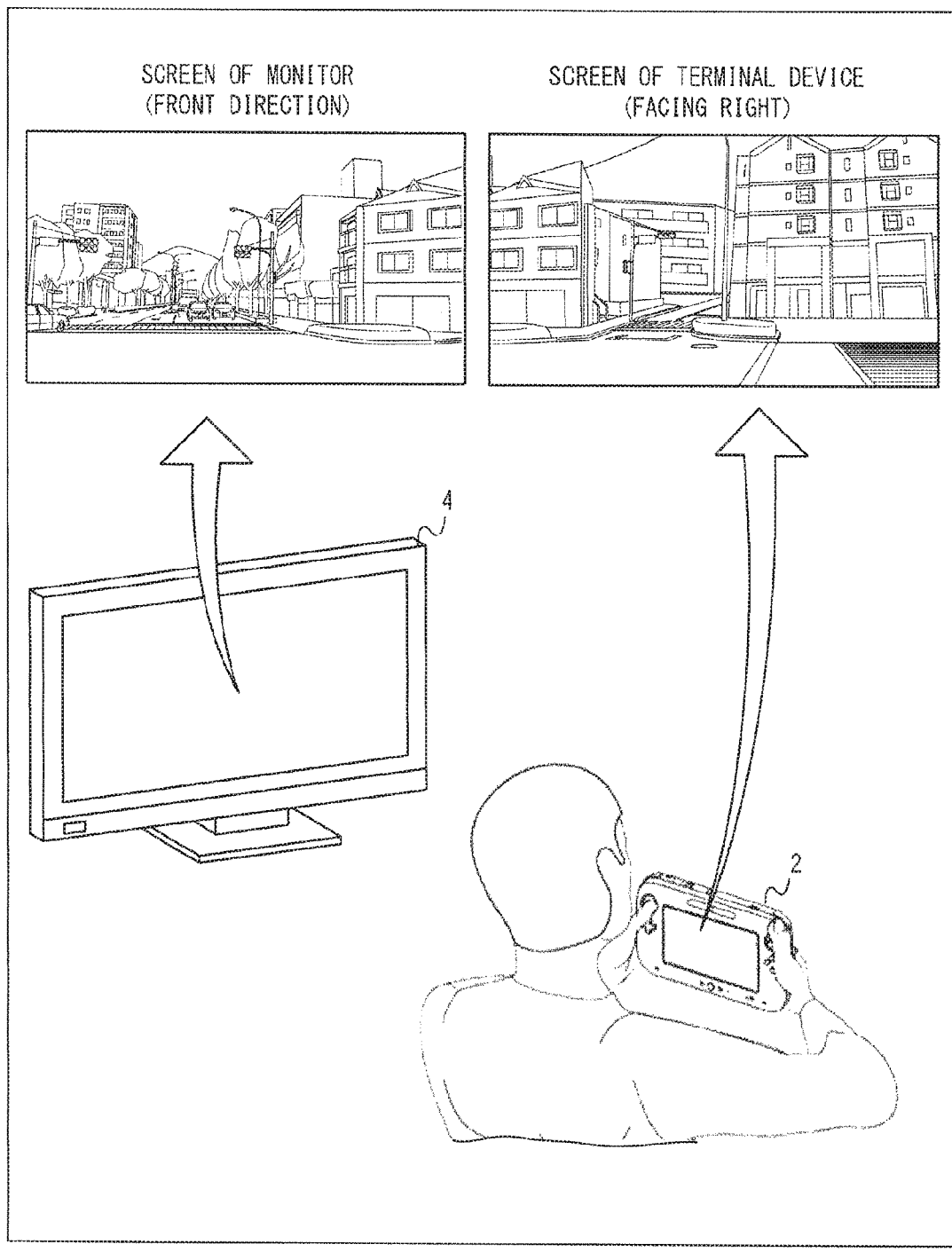
FIG. 2 shows an example of a panoramic video (image) displayed on an information processing system.

An information processing system, an information processing device, an information processing program and a video display method according to an example embodiment will now be described. FIG. 1 is a block diagram showing an example information processing system according to the present embodiment. In FIG. 1, an information processing system 1 includes a terminal device 2, an information processing device 3, a monitor 4, and a controller device 7. The information processing system 1 of the present embodiment produces and displays an image (panoramic image) on a display device (the terminal device 2 and/or the monitor 4).

In the information processing system 1, in response to an input made on the terminal device 2 (and the controller device 7), the information processing device 3 performs an information process (a video playback process shown in FIGS. 30 to 33), and an image obtained as a result of performing the process is displayed on the terminal device 2 and/or the monitor 4. Thus, in the present embodiment, the information processing system 1 has its input function, information processing function and display function implemented by a plurality of devices. Note that in other embodiments, the information processing system 1 may be a single information processing device (e.g., a hand-held-type or portable-type information processing device) having these functions.

The terminal device 2 is an input device that can be held by a user. That is, the terminal device 2 is a portable-type input device. The terminal device 2 is capable of communicating with the information processing device 3. The terminal device 2 transmits, to the information processing device 3, operation data representing an operation performed on the terminal device 2. In the present embodiment, the terminal device 2 includes a display unit (an LCD 11), and the terminal device 2 is also a display device. Where an image is transmitted from the information processing device 3, the terminal device 2 displays the image on the display unit. The terminal device 2 also includes a speaker. Where a sound is transmitted from the information processing device 3, the terminal device 2 outputs the sound from the speaker.

The terminal device 2 includes a touch panel 12 as an input unit. The touch panel 12 is an example of a position detection unit for detecting a position at which an input has been made on a predetermined input surface (the screen of the display unit) provided on a housing 10. Moreover, as an input unit, the terminal device 2 includes an operation unit 13 such as a slide pad, a cross-shaped key, buttons, etc.

The terminal device 2 includes an acceleration sensor 14 as an input unit. The acceleration sensor 14 detects the acceleration for a predetermined axis direction (although there are three axis directions in the present embodiment, there may be one or more axis) of the terminal device 2. The terminal device 2 includes a gyrosensor 15 as an input unit. The gyrosensor 15 detects the angular velocity with respect to the rotation about a predetermined axis direction (although there are three axis directions in the present embodiment, there may be one or more axis) of the terminal device 2. The acceleration sensor 14 and the gyrosensor 15 are sensors for detecting information used for calculating the attitude of the terminal device 2 (information with which the attitude can be calculated or estimated). Note that in other embodiments, the attitude of the terminal device 2 may be calculated by any method. For example, the attitude of the terminal device 2 may be calculated by using another sensor other than the sensor described above or by using a camera capable of capturing an image of the terminal device 2.

The information processing device 3 performs an information process to be performed on the information processing system 1, such as a process of producing an image. In the present embodiment, the information processing device 3 includes a CPU (control unit) 5 and a memory 6, and various functions of the information processing device 3 (information processes shown in FIGS. 30 to 33) are implemented as the CPU 5 executes a predetermined information processing program using the memory 6. Note that the information processing device 3 may have any configuration as long as the information processes described above can be performed. In the present embodiment, an image (panoramic image) is produced by the information processing device 3, and the produced image is output to the terminal device 2 and/or the monitor 4, which are display devices. The information processing device 3 may produce a sound to be output together with a panoramic video. The produced sound is output to the terminal device 2 and/or the monitor 4.

The monitor 4 is an example of a display device for displaying the produced image. The monitor 4 is capable of receiving data transmitted from the information processing device 3. Where an image produced in the information processing device 3 is transmitted to the monitor 4, the monitor 4 displays the image. The monitor 4 may include a speaker. Where a sound produced in the information processing device 3 is transmitted to the monitor 4, a speaker outputs the sound.

The controller device 7 is any input device capable of communicating with the information processing device 3. The controller device 7 may include an input mechanism such as a button (key) and/or stick, or it may be a sensor capable of calculating (estimating) the position and/or the attitude of the controller device 7, such as an acceleration sensor and/or a gyrosensor. The controller device 7 transmits, to the information processing device 3, operation data representing an operation performed on the controller device 7. The information processing device 3 may perform the information processes described above based on operation data from the controller device 7. Note that in other embodiments, the information processing system 1 may not include another input device (the controller device 7) other than the terminal device 2.

2. Playback of Panoramic Video

Next, the process of playing a panoramic video to be performed in the information processing system 1 will be described. FIG. 2 shows an example of a panoramic video (image) displayed in the information processing system 1. As shown in FIG. 2, a panoramic image is displayed on the terminal device 2 and the monitor 4 in the present embodiment. Note that in other embodiments, a panoramic image may be displayed on at least one display device.

Herein, a panoramic image is an image of a wider viewing angle than the viewing angle of the image displayed on a display device. That is, basically, a partial area of a panoramic image is displayed on a display device (note however that where a plurality of display devices are used as in the present embodiment, the entirety of a panoramic image may be displayed on some display devices.). It can also be said that a panoramic image is an image whose viewing direction changes as the display area changes. In the present embodiment, a panoramic image is used which has an omni-direction (360°) viewing angle for the up, down, left and right directions (see FIG. 3). Note however that there may be a dead angle in a panoramic image, and the viewing angle may be about 180°, for example. While a panoramic image is an actual image (photographed image) captured by a camera in the present embodiment, a part or whole of a panoramic image may be a virtual image (CG image).

In the present embodiment, a panoramic video is played by successively displaying panoramic images on display devices (the terminal device 2 and the monitor 4). That is, a panoramic video is formed by a plurality of panoramic images. The plurality of panoramic images are each assigned a frame number, and a panoramic video is played by displaying panoramic images in the order of frame number. In the present embodiment, a panoramic video is played in which the viewpoint moves over time. That is, as shown in FIG. 2, a panoramic video is played in which a panoramic image of the surrounding area as one sees from a street is displayed while moving along a street (the viewpoint moves along a street).

As shown in FIG. 2, a partial range of a panoramic image is displayed on each display device (the terminal device 2 and the monitor 4). Hereinafter, a range of a panoramic image to be displayed on a display device is referred to as a "display range". In FIG. 2, a panoramic image of a display range such that the viewing direction is the direction in which the viewpoint moves (the front direction) is displayed on the monitor 4. In the present embodiment, the display range on the monitor 4 is basically fixed to a predetermined range, and may be changed under certain conditions (the details will be discussed later).

On the other hand, the display range on the terminal device 2 is changed in accordance with the attitude of the terminal device 2. For example, in FIG. 2, the terminal device 2 is in an attitude facing right with respect to the front direction (the direction from the user (the terminal device 2) toward the monitor 4), and a panoramic image of a display range obtained when the viewing direction is facing right with respect to the moving direction described above is displayed on the terminal device 2. Thus, the information processing system 1 determines a display range of a panoramic video to be displayed on a display device based on an input made on an input device (the terminal device 2). Thus, a user can see a panoramic video while freely changing the viewing direction (display range) through an operation performed on the terminal device 2 (an operation of changing the attitude thereof). Note that in other embodiments, a display range may be determined by any method so that the display range changes in accordance with an operation by a user.

Figure 3:
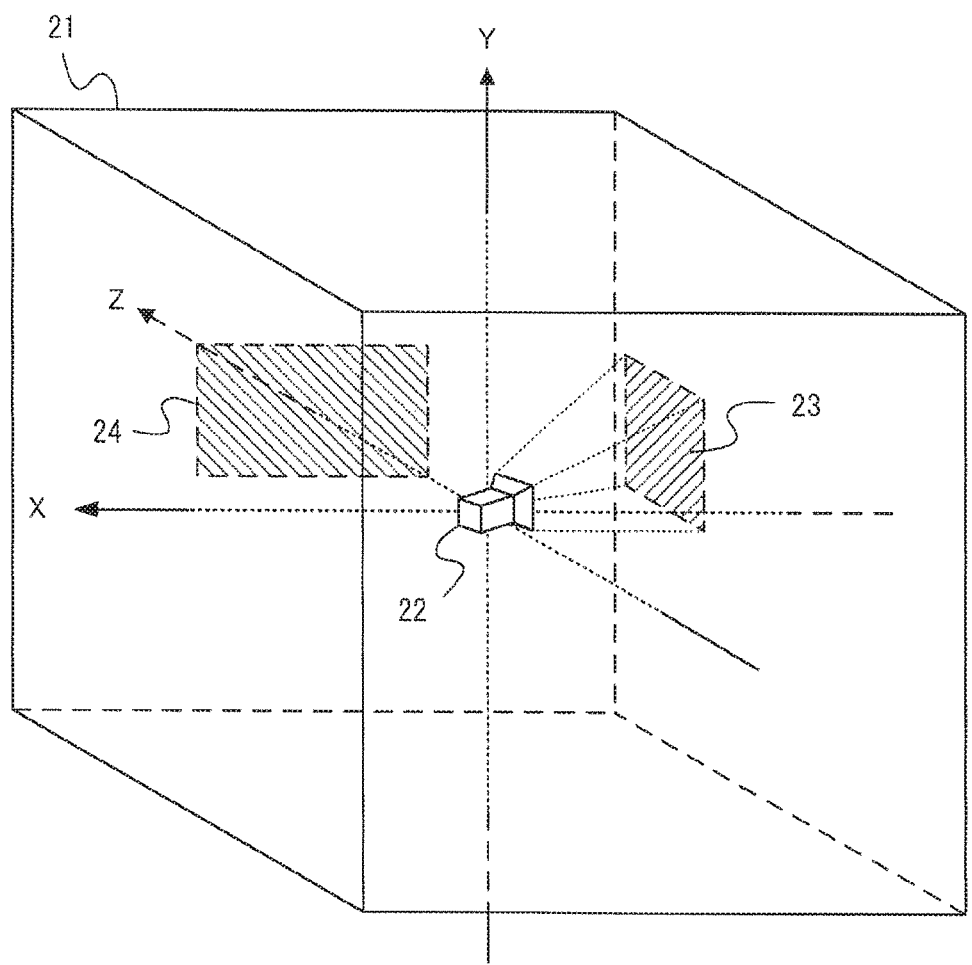
FIG. 3 shows an example of a method for determining a display area in accordance with an attitude of a terminal device.

FIG. 3 shows an example of a method for determining a display area in accordance with the attitude of the terminal device 2. In the present embodiment, as shown in FIG. 3, a three-dimensional model 21 is arranged in a virtual space, and a virtual camera 22 is arranged inside the three-dimensional model 21. Then, when producing an image of the three-dimensional model 21 (the inner side surface of the three-dimensional model 21) as viewed from the virtual camera 22, a panoramic image is rendered on the inner side surface of the three-dimensional model as a texture, thus producing a panoramic image. Then, the display range is the viewing range of the virtual camera 22 (a hatched area 23 shown in FIG. 3) of the panoramic image. Note that while the three-dimensional model 21 is assumed to be cubic in the present embodiment, the three-dimensional model 21 may have any shape, e.g., a spherical or columnar (e.g., cylindrical) shape.

In FIG. 3, the attitude of the virtual camera 22 for producing an image to be displayed on the terminal device 2 is controlled in accordance with the attitude of the terminal device 2. Therefore, the display range changes in accordance with the attitude of the terminal device 2. Note that the information processing device 3 may change the size of a display range (zoom in or zoom out), in addition to the position of a display range, in accordance with an operation performed on the terminal device 2.

On the other hand, a virtual camera (not shown) for producing an image to be displayed on the monitor 4 is set so that the viewing direction thereof is basically facing in a predetermined reference direction (herein, the moving direction described above. The Z-axis positive direction in FIG. 3). That is, the display range of the monitor 4 (a hatched area 24 shown in FIG. 3) is set at a position in the reference direction from the virtual camera. The position of each virtual camera is fixed to a predetermined position in the three-dimensional model 21 (the center position of the three-dimensional model 21 in the present embodiment).

Note that in the present embodiment, the viewing direction of the virtual camera 22 is controlled so that the relationship between the viewing direction of the monitor 4 (the viewing direction of the panoramic video displayed on the monitor 4) and the viewing direction of the terminal device 2 (the viewing direction of the panoramic video displayed on the terminal device 2) generally coincides with the relationship between the orientation of the monitor 4 and the orientation of the terminal device 2. Specifically, when the terminal device 2 is in an attitude facing the monitor 4 (this will be referred to as the reference attitude), the viewing direction of the virtual camera 22 is the same direction as the virtual camera for the monitor 4 (that is, the predetermined reference direction). Then, when the attitude of the terminal device 2 changes from the reference attitude, the attitude of the virtual camera 22 changes by an amount that is determined in accordance with the amount of change and in the direction in which the attitude has changed. Thus, a user can see a scene in an intended viewing direction by changing the orientation of the terminal device 2 while seeing a scene in a certain viewing direction on the monitor 4. By matching the change in the attitude of the terminal device 2 with the change in the attitude of the virtual camera 22, the orientation of the terminal device 2 in the real space coincides with the viewing direction of the virtual camera 22 in the virtual space, and therefore a user can more realistically feel the space represented by the panoramic image.

3. Inputting Comment by User

Figure 4:
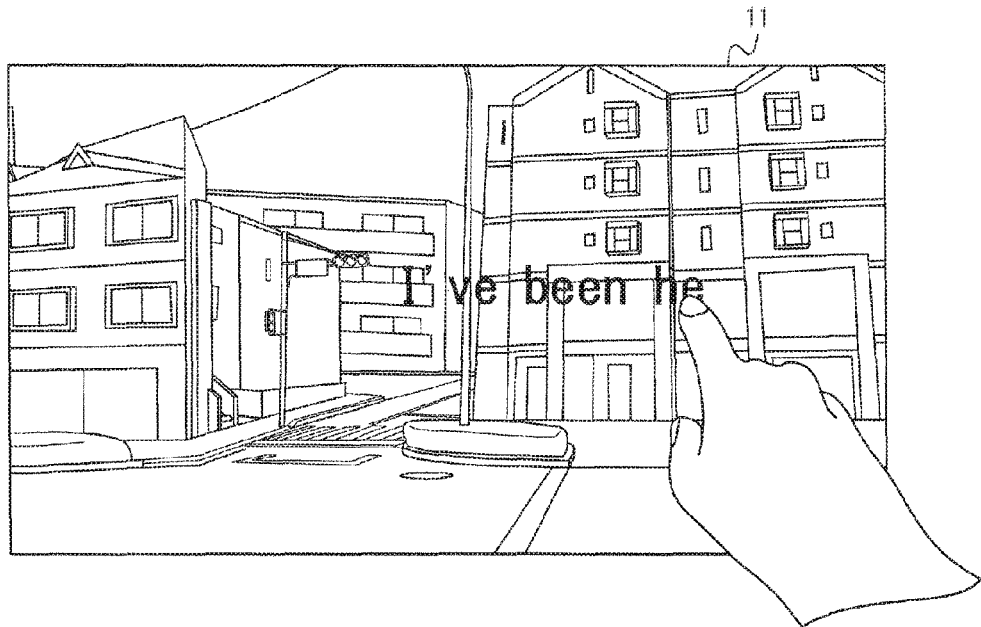
FIG. 4 shows an example of an operation by a user of inputting a comment.
Figure 5:
FIG. 5 shows an example of a panoramic video displaying a button for inputting additional information.

In the present embodiment, a user can input a comment (additional information) while a panoramic video is played (see FIGS. 4 and 5). The input comment is thereafter output together with a panoramic video when the panoramic video is played (see FIGS. 10 to 13). Note that additional information (comment) may be displayed as an image or may be output as a sound. Thus, a user can not only simply see a panoramic video, but also view a panoramic video together with comments that have been input by the user or other users. Therefore, according to the present embodiment, the information processing system 1 can present, to a user, more information when displaying a panoramic image. With the presentation of additional information, a user can let other users know a range of a panoramic video that the user has seen, or can know a range that other users have seen. The details of a method for accepting a comment and outputting the input comment will now be described.

In the present embodiment, information added to a panoramic video, such as the comment described above, will be referred to as "additional information". In the present embodiment, additional information input by a user is a comment (message). Note however that additional information may be of any content, and may be, for example, rating information (information representing a rating on an object appearing in a panoramic video), user information, or the like, to be described later.

(3-1) Inputting Additional Information

Referring to FIGS. 4 and 5, a method by which a user inputs additional information (comment) will be described. While a panoramic video is played, the information processing system 1 accepts an input of a comment on the panoramic video displayed on the terminal device 2. FIG. 4 shows an example of an operation for a user to input a comment. In the present embodiment, the information processing system 1 accepts an input (touch input) on the screen (on the touch panel 12) where a panoramic video is displayed. In FIG. 4, a user can input a comment by handwriting directly on the screen where a panoramic video is displayed. Note that the specific input method of additional information (comment) may be any method, and in other embodiments, the input may be made by using a control unit such as a keyboard, a button, or the like, for example, or a sound input may be made if the terminal device 2 includes a microphone.

For example, an input of additional information may be made by making an input on a button displayed on a panoramic video. FIG. 5 shows an example of a panoramic video displaying a button for inputting additional information. As shown in FIG. 5, when a rate button 31 is displayed on a panoramic video, the information processing system 1 may accept an input on the rate button 31 (e.g., an input of touching the rate button 31), as an input of additional information. For example, a user may make an input on the rate button 31 a number of times in accordance with the rating.

When inputting additional information, the information processing system 1 may accept an input (position-specifying input) of specifying a position on a panoramic image displayed on the LCD 11 of the terminal device 2. For example, before inputting a comment, a user may be allowed to touch on a position at which the user is inputting a comment. Note that where additional information is displayed together with a panoramic video, additional information may be displayed while being associated with the position specified by the position-specifying input, the details of which will be described later.

Note that at least while accepting an input of additional information, the information processing system 1 may pause the playback of a panoramic video. For example, the playback of a panoramic video may be paused from the start to the end of an input of additional information (comment). This is for preventing a user inputting a comment from missing the content of the video, and for making it easier to input a comment. Note that in other embodiments, the playback of a panoramic video may continue even while additional information is being input.

(3-2) Storing Additional Information

Figures 6, 7:
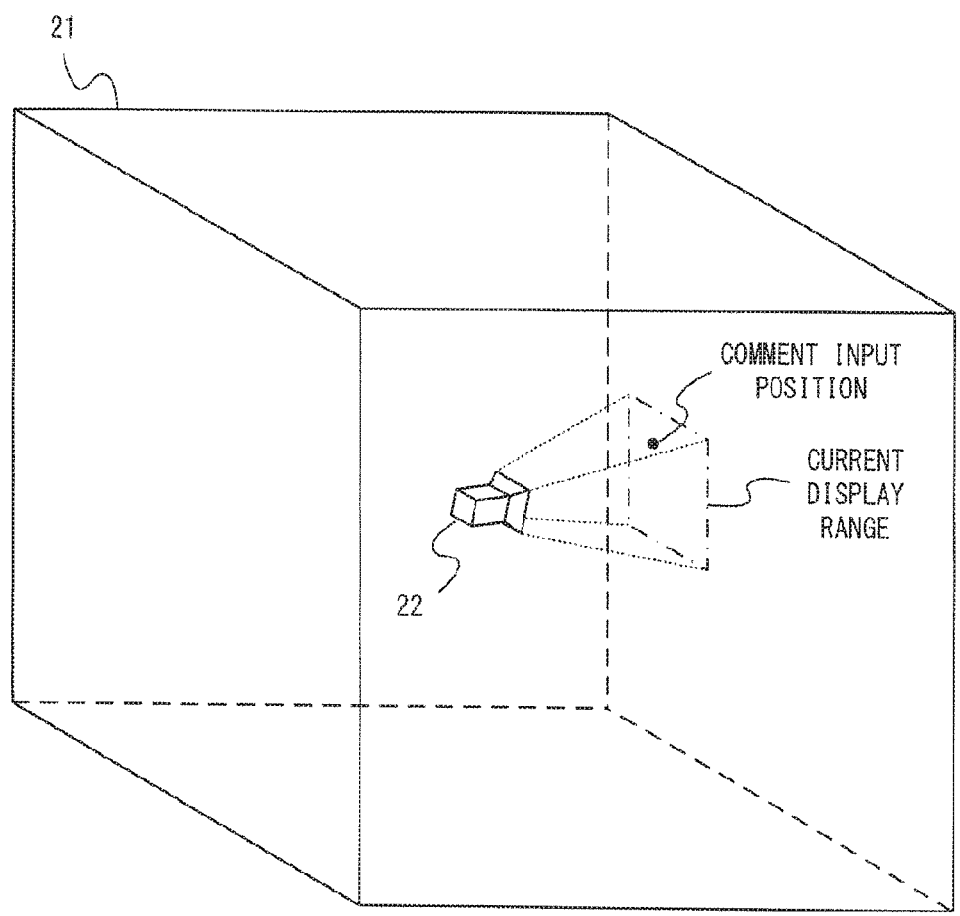
FIG. 6 shows an example of information (referred to as "input information") stored in response to an input of additional information.
FIG. 7 shows an example of a method for determining a condition regarding range information.

When additional information is input, the information processing system 1 stores the additional information and information used for outputting the additional information. FIG. 6 shows an example of information (referred to as "input information") to be stored in response to an input of additional information. In the present embodiment, as shown in FIG. 6, input information including additional information and input range information is stored in a storage unit. Although the memory 6 is used as the storage unit in the present embodiment, it may be any storage device that can be accessed by a computer of the information processing system 1 (the information processing device 3).

Input range information described above is information with which it is possible to identify the display range at the time when the input of additional information was accepted and/or a position within that display range. Note that information with which it is possible to identify a display range and/or a position within that display range will be hereinafter referred to as "range information". That is, input range information is range information when an input of additional information was accepted. Hereinafter a display range when an input of additional information was accepted will be referred to as an "input range", and a position (within a display range) when an input of additional information was accepted will be referred to as an "input position".

Input range information may be any information as long as it is possible to identify at least one of the input range and the input position. In the present embodiment, information with which it is possible to identify the input position is stored as input range information. For example, the input position may be a position specified by a position-specifying input described above, a position at which additional information was input (the position at which hand-written comment was input, or the position of the rate button 31), or a predetermined position (e.g., a center position) in a display range at the point in time when additional information was input. Regarding a sound input, input range information may be stored which represents a display range (or a center position of the display range) at the point in time when a voice of the user was detected by a microphone, for example.

As input range information representing an input range and/or an input position, information of a vector representing the attitude (viewing direction) of the virtual camera 22 is stored in the present embodiment (see FIG. 6). For example, an input position can be represented by a vector representing a direction from the position of the virtual camera 22 toward the input position on the three-dimensional model 21. An input range can be represented by a vector representing a direction from the position of the virtual camera 22 toward the center position of the input range on the three-dimensional model 21, and a vector representing the attitude with respect to the rotation about that direction. Note that in other embodiments, input range information may include information (zoom information) indicating the size of a display range, in addition to information of a vector. In other embodiments, information representing a range or a position on the three-dimensional model 21 may be stored as input range information.

In the present embodiment, additional information is information representing the content of a comment (see FIG. 6). Specifically, text information representing the content of a comment may be stored as additional information, or when a handwriting input on the touch panel 12 is accepted, information representing the trace of the input touch position may be stored as additional information. The content of the information stored as additional information is not limited to the content of a comment.

As shown in FIG. 6, input information further includes time information in the present embodiment. Time information is information with which it is possible to identify a playback time point at which an input of additional information was accepted. Note that a playback time point is a point along the time axis of a panoramic video. Hereinafter, a playback time point at which an input of additional information was accepted will be referred to as an "input time point". In the present embodiment, time information is information of a frame number (denoted as the "$i^{th}$ frame" in FIG. 6) of a panoramic image that was displayed at the input time point. Time information may be any information with which it is possible to identify a playback time point along the time axis of a panoramic video. For example, time information may be information representing the elapsed time since the start of the playback of a panoramic video. Where the viewpoint of a panoramic video moves through a predetermined space over time as in the present embodiment, information representing the position of the viewpoint in the predetermined space may be stored as time information. Note that in other embodiments, input information does not need to include time information.

As shown in FIG. 6, in the present embodiment, input information further includes user information. User information is information with which it is possible to identify a user who has input the additional information. User information may be of any specific content. In the present embodiment, before playing a panoramic video, user identification information (e.g., the name (nickname) of a user) is registered, and the registered identification information is stored as user information. Note that in other embodiments, input information does not need to include user information.

(3-3) Outputting Additional Information

When a panoramic video is played, with input information including additional information stored as described above, the information processing system 1 outputs additional information together with the panoramic video. In the present embodiment, the information processing system 1 controls additional information to be output together with the panoramic video based on input range information. Typically, while a panoramic video is played, if the input time point has been reached and if the input position is included in the current display range, additional information is displayed together with the panoramic video (see FIG. 10, etc.). Note that additional information is not displayed if, for example, the input time point has not been reached or if the input position is not included in the current display range (if the current viewing direction is facing in a different direction from that when the additional information was input). How additional information is output will now be described.

(3-3-1) Method for Determining Output of Additional Information

In the present embodiment, the information processing system 1 determines whether or not to output additional information using time information and input range information. Specifically, the information processing device 3 determines (a) whether the display range of the panoramic video being played satisfies a condition regarding a display range and/or a position identified by input range information, and (b) whether the timing of the panoramic video being played satisfies a condition regarding a playback time point identified by time information.

FIG. 7 shows an example of a method for making a decision on a condition regarding input range information. As the decision regarding (a) above, the information processing device 3 may determine whether the current display range overlaps a comment input position (a position identified by input range information) (see FIG. 7). For example, where the input position is included in the current display range as shown in FIG. 7, it is determined that the condition (a) is satisfied. Thus, it is possible to determine whether the comment input position is being displayed on the terminal device 2.

Figure 8:
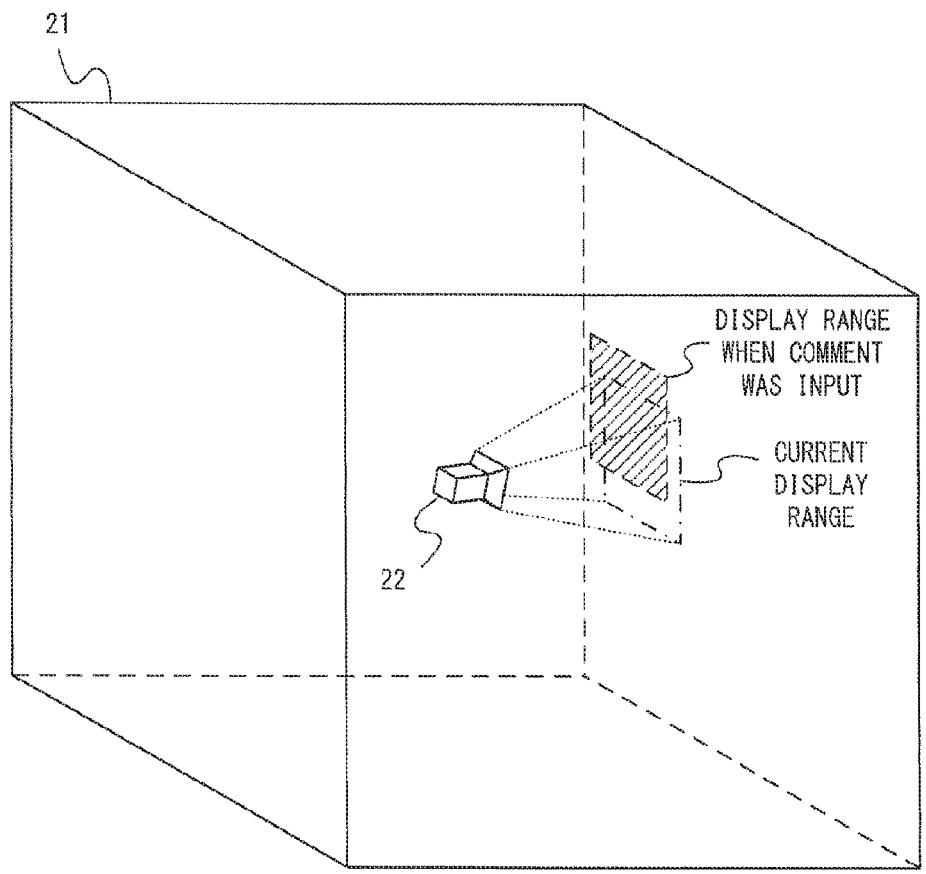
FIG. 8 shows another example of a method for determining a condition regarding range information.

FIG. 8 shows another example of a method for making a decision on a condition regarding the input range information. In other embodiments, as the decision regarding (a) above, the information processing device 3 may determine whether the current display range overlaps the display range at the time of comment input (the display range identified by time information). For example, where the input range at least partially overlaps the current display range as shown in FIG. 8, it is determined that the condition (a) is satisfied. Thus, it is possible to determine whether the input range at least partially overlaps the current display range. That is, it is possible to determine whether at least a portion of the display range at the time of comment input is currently displayed.

Note that the decision described above using FIGS. 7 and 8 may be made by comparing a position (or a range) on the three-dimensional model 21, or by comparing the vector representing the attitude of the virtual camera 22.

Figure 9:
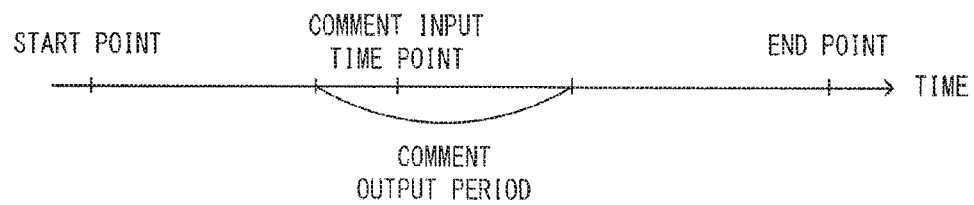
FIG. 9 shows an example of a comment output period.

As the decision regarding (b) above, it may be determined whether the current playback time point of the panoramic video is within a predetermined output period including the playback time point (input time point) identified by time information. FIG. 9 shows an example of a comment output period. As shown in FIG. 9, the output period may be set as a period that starts a predetermined amount of time before the comment input time point (the playback time point indicated by time information) and ends upon passage of a predetermined output time, for example. Note that the output period may be set based on the comment input time point, or may be set by the user who has input the comment. Where the comment is text information, the output period may be set to a length determined in accordance with the number of characters (e.g., so that it is longer for a larger number of characters).

If the decisions (a) and (b) are both affirmative, the information processing system 1 determines to output additional information together with a panoramic video. In the present embodiment, a comment (additional information) is output when the current display range includes the input position therein during an output period that includes the comment input time point therein.

(3-3-2) Manner of Outputting Additional Information

Figure 10:
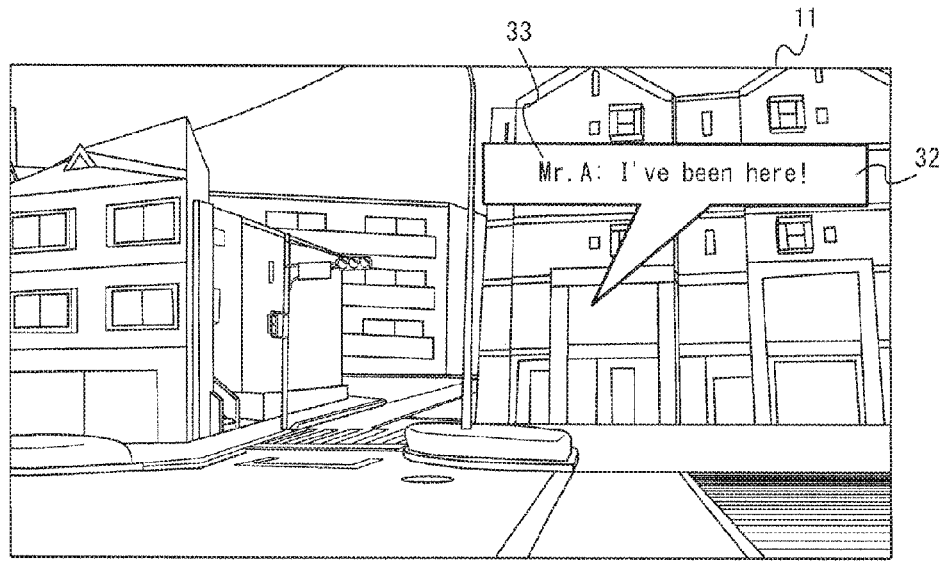
FIG. 10 shows an example of an image in which additional information is displayed together with a panoramic video.

FIG. 10 shows an example of an image in which additional information is displayed together with a panoramic video. When the information processing system 1 determines to output additional information, a comment image 32 is displayed on a panoramic video on the terminal device 2 as shown in FIG. 10. Thus, in the present embodiment, if a comment is input for an object (herein, a building) appearing in a panoramic video, the panoramic video is displayed with the comment attached to the object when the panoramic video is played thereafter.

Figure 11:
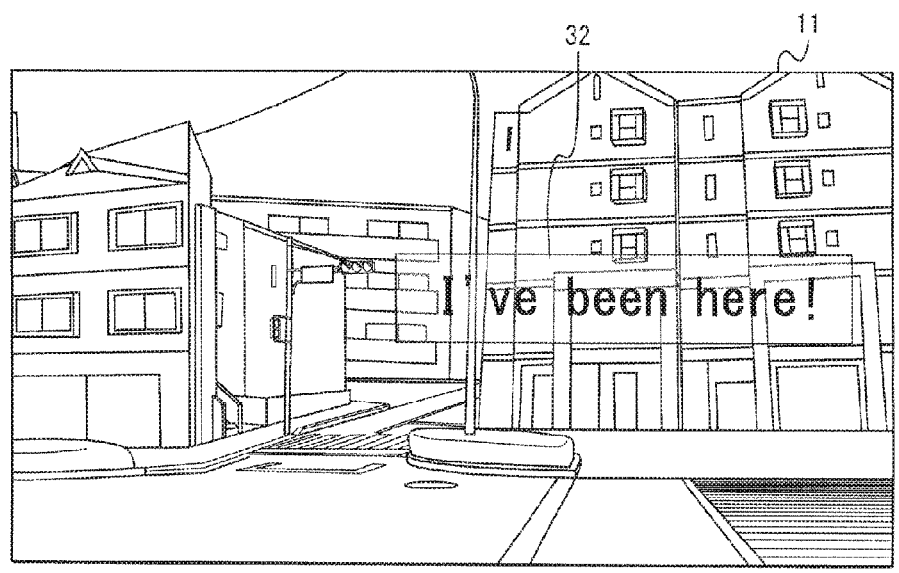
FIG. 11 shows another example of additional information to be output.

Now, the comment image 32 indicates an input position on a panoramic image as shown in FIG. 10. That is, if the input position is included in the current display range, the information processing system 1 displays an image of the additional information in association with the input position. Thus, it is possible to allow a user to clearly recognize the position at which the comment has been made. For example, in FIG. 10, a user can easily grasp the building which has been commented on. Note that FIG. 11 shows another example of additional information to be output. As shown in FIG. 11, the comment image 32 may be displayed at the input position. For example, where a comment has been made by an handwriting input on the touch panel 12, the hand-written characters may be displayed (as they are) at the input position. Note that while an image of additional information is displayed while being associated with the input position, it does not need to be displayed at the input position. For example, when the comment image 32 is displayed at the input position, it may possibly make it more difficult to see the object which has been commented on. Therefore, the comment image 32 may be displayed at a position slightly off the input position (as shown in FIG. 10). Note that the term "image" as used in the present specification includes those representing characters (text information).

As shown in FIG. 10, in the present embodiment, a user image 33 representing the name (Mr. A) of the user who has input the comment is displayed together with the comment image 32. Thus, the information processing system 1 outputs additional information, and user information associated with additional information. Note that user information to be output may be the name of a user, a character (e.g., a character resembling a user) set for each user, an image of a likeness of a user, or the like. According to the present embodiment, a user who sees additional information can not only know the content of additional information, but also know where in a panoramic video another user who has input the additional information was seeing. Now, a panoramic video is a video whose area cannot be contained within one screen, and a display range on the terminal device 2 can be freely controlled by the user. Therefore, the position of a display range and the transition thereof while viewing a panoramic video differs from one user to another. Therefore, it is an interesting piece of information for a user to know where in a panoramic video another user was seeing, as in the present embodiment. Note that user information may be displayed together with additional information also in other manners of display (FIGS. 11 to 13, and the like) other than the manner of displaying additional information shown in FIG. 10.

Note that in other embodiments, user information may be displayed as additional information itself. For example, only an image representing user information (e.g., an image of a likeness of a user) may be displayed at an input position. Thus, a user who has input additional information can let another user, who sees the additional information (user information), know that the user was looking at a display range including the input position therein.

Note that where the viewpoint of a panoramic video moves over time as in the present embodiment, each object appearing in the panoramic video moves in the opposite direction to the viewpoint moving direction on the panoramic image. Therefore, in such a case, the information processing system 1 may display additional information while moving additional information following the movement of an object associated with the additional information. Note that an "object associated with additional information" is an object that is displayed at the input position at the input time point, in other words, an object arranged at a position that is identified by the input range information at the input time point. Specifically, additional information may be displayed so as to move over time in the opposite direction to the viewpoint moving direction. For example, where the viewpoint moving direction is the forward direction, additional information may be displayed so as to move in the front-to-back direction. Note that where the moving direction and the moving velocity of the viewpoint are known, it is possible to identify the direction and the velocity of the movement of an object (a building, or the like) that is fixedly arranged in the space on a panoramic video, and it is possible to calculate the algorithm for moving additional information based on the moving direction and the moving velocity of the viewpoint. Therefore, by moving additional information according to this algorithm, it is possible to display additional information while moving the additional information following the movement of an object. Note that additional information does not need to exactly match the position of the object, but may be displayed somewhat in the vicinity of the object.

Figure 12:
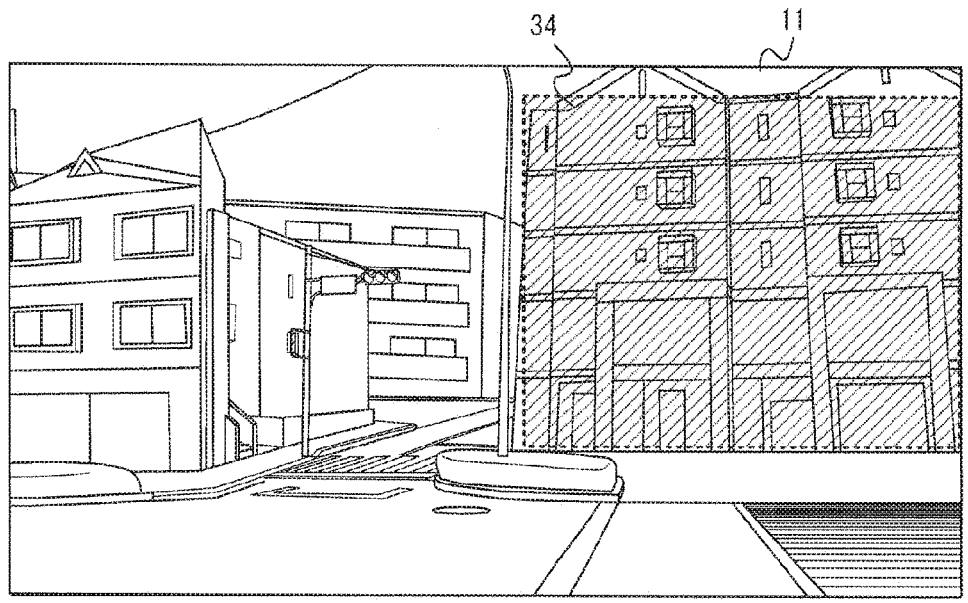
FIG. 12 shows an example of object information.

As a method for moving additional information following the movement of an object, object information representing the position and/or the range of the object (on the panoramic image) may be prepared together with the panoramic image. FIG. 12 shows an example of object information. As shown in FIG. 12, where an object (a building in FIG. 12) appears in a panoramic image, object information representing the range of this object (e.g., a dotted-line area 34 shown in FIG. 12) is stored together with a panoramic video. Note that for each of a plurality of panoramic images of a panoramic video, the information processing system 1 stores object information of one or more objects appearing therein while the object information is associated with the panoramic image. When accepting an input of a comment, the information processing device 3 determines whether the comment input position is within the range of the object using the object information. If the input position is within the range of the object, the information processing device 3 stores information representing the object as input range information. When playing a panoramic video, the information processing device 3 displays an image of a comment while the image is associated with the position of the object at least on the condition that the object is included in the display range of the panoramic video being played. Specifically, the comment is displayed while being associated with the position (or range) of the object identified by the object information. Therefore, it is possible to display additional information at an accurate position determined in accordance with the position of an object. With the method of using object information described above, even with an object that seems to be moving on a panoramic image by moving through the space (irrespective of the movement of the viewpoint), additional information can be displayed at a position determined in accordance with the object.

Note that where an image of a map to be described later (see FIG. 25) is provided and a position on the map can be associated with a position on a panoramic video, object information may be stored while being associated with the map (as information representing the position or range on the map). Then, the information processing device 3 may identify a range on the map corresponding to a display range, and identify the position or range of an object on a panoramic video from object information that is associated with the identified range.

Where object information is stored as input range information, additional information can be displayed during a period in which an object represented by the object information appears in a panoramic video. That is, the output period of additional information can be controlled (without using the time information) by storing object information as input range information.

Figure 13:
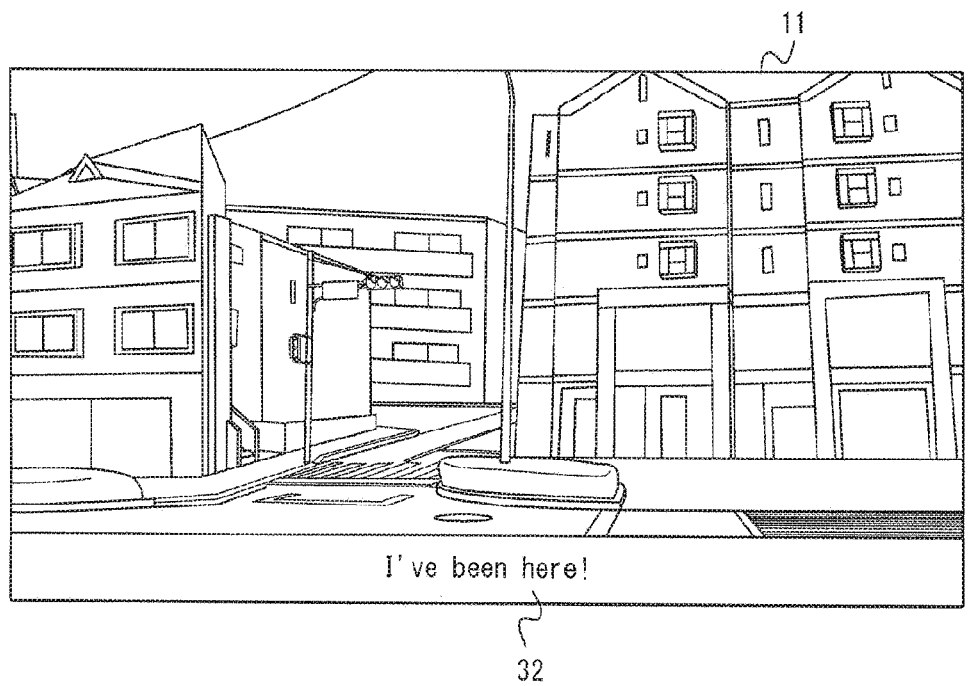
FIG. 13 shows another example of an image in which additional information is displayed together with a panoramic video.

In other embodiments, additional information may be displayed at a predetermined position on the screen of the terminal device 2. FIG. 13 shows another example of an image in which additional information is displayed together with a panoramic video. As shown in FIG. 13, the comment image 32 may be displayed in a predetermined area of the screen (a lower area in FIG. 13) (irrespective of the position of the object associated with the comment). For example, where the comment input position is not stored as input range information, it is difficult to display the comment at a position associated with the object, and therefore the comment may be displayed at a predetermined position on the screen. That is, where the display range of the panoramic video being played at least partially overlaps the display range when additional information was accepted, the information processing system 1 may display the additional information at a predetermined position on the screen of a display device. Thus, it is possible to easily identify the position at which additional information is to be displayed. Moreover, as shown in FIG. 13, the additional information may be displayed in an area different from the area where a panoramic video is displayed. Thus, a panoramic video can be displayed in an easy-to-view manner since the panoramic video is not hidden by additional information.

(3-3-3) Output Content of Additional Information

Figure 14:
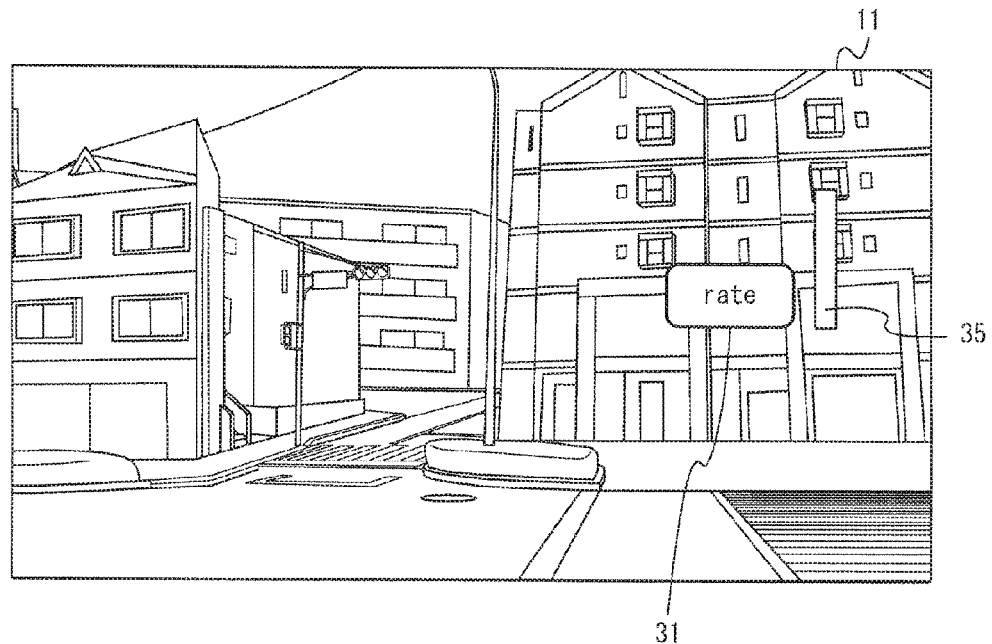
FIG. 14 shows another example of an image in which additional information is displayed together with a panoramic video.

In other embodiments, the content to be output as additional information is not limited to a comment input by a user, but may be other information based on a user input. For example, where rating information is input by using the rate button 31 described above, rating information representing the input count on the rate button 31 may be stored as additional information, and an image representing the input count may be output as additional information. FIG. 14 shows another example of an image in which additional information is displayed together with a panoramic video. In such a case, a bar 35 whose length is associated with the input count may be displayed as additional information as shown in FIG. 14, for example. Note that the bar 35 is displayed at a position based on (e.g., a position in the vicinity of) the input position of additional information (the position of the rate button 31).

Note that the information processing system 1 may not only output information based on one piece of additional information, but may also output information based on a plurality of pieces of additional information. For example, in the example shown in FIG. 14, the length of the bar 35 may be set to represent the sum of the input counts from a plurality of pieces of input information (i.e., the total count of inputs made on the rate button 31 by a plurality of users), or the average value thereof. Thus, where additional information is information representing a numerical value (herein, the input count), the information processing system 1 may output information representing a numerical value (herein, the sum of input counts) obtained based on numerical values represented by a plurality of pieces of additional information to be output. Note that the "plurality of pieces of additional information to be output" may be regarded as such on a condition that they are pieces of additional information of the same kind whose output content should be grouped together (e.g., pieces of additional information regarding the rate button 31). Thus, it is possible to present, to a user, statistical information based on a plurality of users (or a plurality of views). The information processing system 1 may output information representing the number of pieces of additional information, of the plurality of pieces of additional information, that satisfy a predetermined condition. For example, information representing the number of pieces of additional information of the same kind may be output.

Figure 15:
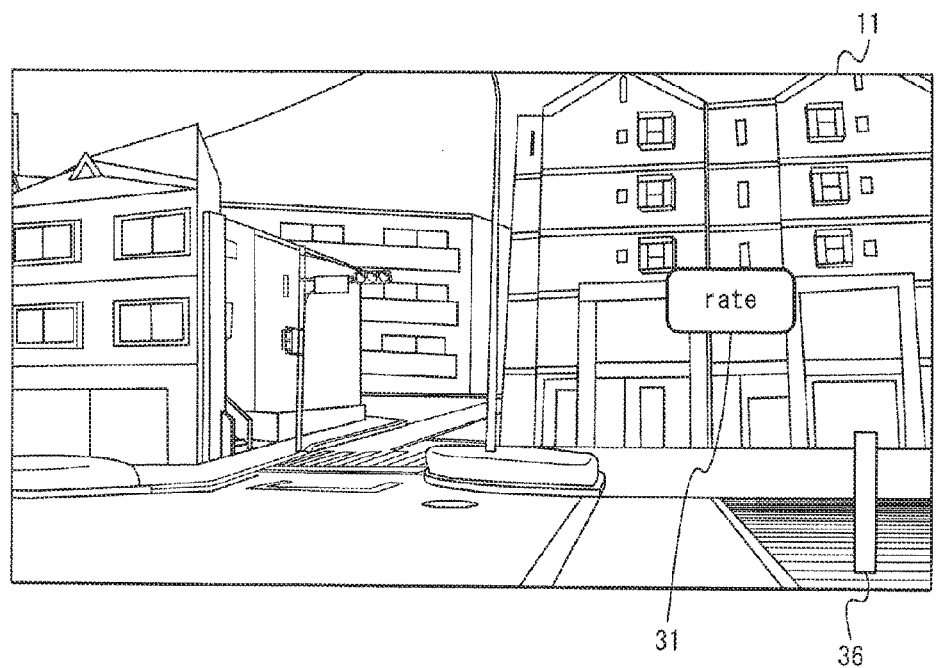
FIG. 15 shows another example of an image in which additional information is displayed together with a panoramic video.

In other embodiments, the information processing system 1 may perform a control so that the manner of outputting additional information changes in accordance with the change in the display range of the terminal device 2. FIG. 15 shows another example of an image in which additional information is displayed together with a panoramic video. Note that in FIG. 15, as in the case shown in FIG. 14, it is assumed that the input count on the rate button 31 is stored as additional information. Then, the information processing system 1 displays a bar 36 whose length is associated with the input count and whose length is associated with the positional relationship between the current display range and the input range. That is, the bar 36 is displayed to be longer as the input count is higher. Moreover, the bar 36 is displayed to be longer as the rate button 31 (the object associated with the rate button 31) is closer to the center of the display range. Note that the information processing system 1 can determine the positional relationship based on input range information. The bar 36 is always displayed on the screen of the terminal device 2, irrespective of the current display range. Therefore, the length of the bar 36 changes in accordance with the movement of the display range. Note that the length of the bar 36 may be determined while taking into consideration the input count on another rate button in addition to the rate button 31. That is, the bar 36 may be displayed to be longer as there exist more objects with higher ratings (higher input counts) within the display range. Thus, the user can look for objects with higher ratings by moving the display range while looking at the bar 36.

As described above, the information processing system 1 may determine, based on input range information, the positional relationship between the display range of the panoramic video being played and the display range when additional information was accepted, and change the manner of outputting additional information (the length of the bar) based on the positional relationship. Thus, information that changes in accordance with the display range can be presented to the user, and the user can control the display range based on the information.

Note that in other embodiments, the information processing system 1 may output a sound representing additional information, in addition to or instead of displaying an image representing additional information. Note that the sound may be output from the terminal device 2, from a speaker of the monitor 4, or from both.

(3-3-4) Output Destination of Additional Information

In the present embodiment, additional information is displayed on the terminal device 2. The terminal device 2 is a display device whose display range is controlled by a user. Therefore, since a user can recognize additional information when moving the display range by controlling the terminal device 2, the user is allowed to more certainly recognize additional information.

Note that in other embodiments, additional information may be displayed on a display device (the monitor 4) different from the terminal device 2. For example, the information processing system 1 may display additional information on the monitor 4 while displaying, on the terminal device 2, a panoramic video of a display range determined based on an input made on the terminal device 2. Thus, a panoramic video displayed on the terminal device 2 can be presented in an easy-to-view manner. Where there is another user seeing the monitor 4 other than the user using the terminal device 2, the additional information can be presented also to the other user. Additional information may be displayed on the monitor 4, when the input position of the additional information is included within the display range of the monitor 4, or the display range on the monitor 4 at least partially overlaps the input range of the additional information. Thus, it is possible to increase the chance for a user to see additional information.

In other embodiments, the information processing system 1 may display an entire panoramic image on the monitor 4, or may display an image of the space represented by the panoramic image (e.g., a bird's-eye view or a map) on the monitor 4. Then, additional information may be displayed together with (while being superimposed on) the image displayed on the monitor 4.

(3-4) Additional Information from Other Users

Other than storing input information by an input made on the terminal device 2, the information processing system 1 may obtain input information from another device outside the information processing system 1, and output additional information included in the input information together with a panoramic video. For example, the information processing device 3 may be capable of communicating with an external device via a network such as the Internet, and may obtain input information from the external device. Note that the "external device" may be an information processing device included in a system having the same function as the information processing system 1, for example, or may be a server storing input information. Thus, a user can see a panoramic video with additional information (comment) added thereto, which has been input by another user (e.g., a friend or a celebrity). By seeing additional information from another user, a user can know where in a panoramic video the other user was seeing.

4. Outputting Guide

In the present embodiment, guide information is output, in addition to additional information (comment), while a panoramic video is played. Guide information is information for guiding a target on a panoramic image. Herein, a target is a position and/or a range set on a panoramic image. For example, the position at which additional information described above is displayed may be set as a target, a position specified by another user may be set as a target, or a display range obtained from history information to be described later may be set as a target. Guide information can also be said to be information for notifying the user of a location on a panoramic image where a target is set.

Figure 16:
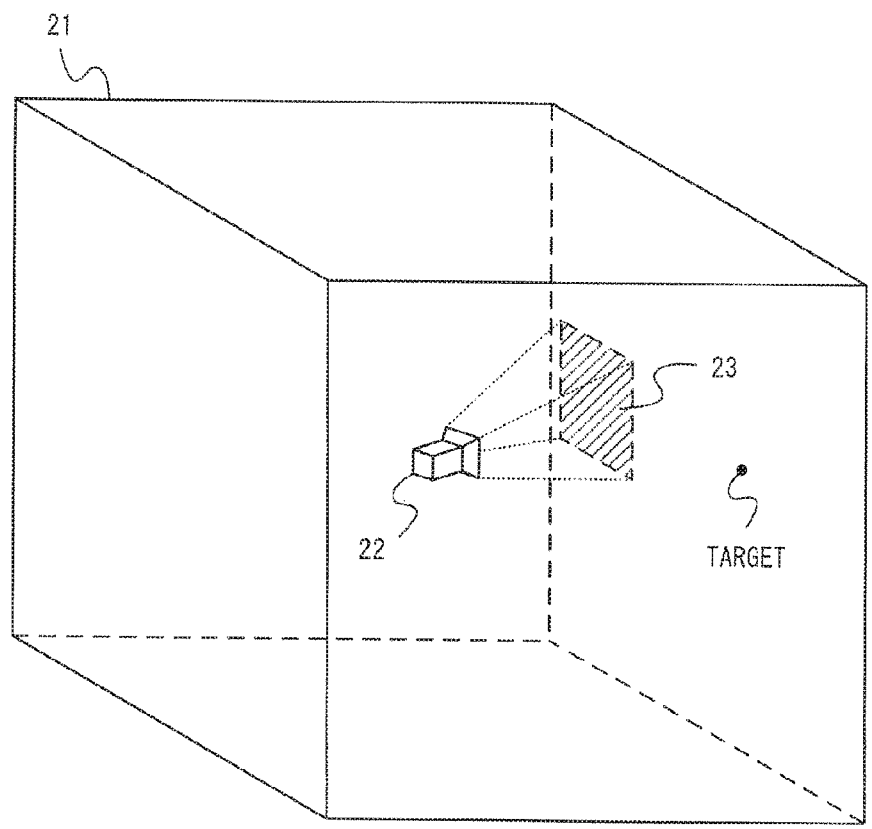
FIG. 16 shows an example of a positional relationship between a display range and an additional information input position.

FIG. 16 shows an example of a positional relationship between a display range and a target. In FIG. 16, the display range is an area 23, and the target is outside the area 23. Therefore, in a state shown in FIG. 16, information associated with the position of the target is not output. Then, even though the position of the target is very close to the display range, a user may possibly not notice the presence of the target and therefore not move the display range toward the target.

Figure 17:
FIG. 17 shows an example of guide information.

In view of this, in the present embodiment, the information processing system 1 outputs guide information together with a partial area of a panoramic video in order to let the user know of the target. FIG. 17 shows an example of guide information. Note that the guide information shown in FIG. 17 is what is displayed when the relationship between the display range and the target is as shown in FIG. 16. As shown in FIG. 17, in the present embodiment, a guide image 41 representing an arrow indicating the right direction ward is displayed as the guide information. Thus, it is possible to notify a user of the direction in which the user should move the display range in order for the position or range of the target to be included within the display range. Thus, where guide information is output together with a panoramic video, it is possible to guide a user to move the display range toward the target by presenting guide information to the user even if the current display range does not include the target. Note that guide information may be displayed as an image or output as a sound.

(4-1) Setting Target

The information processing device 3 sets a range and/or position on a panoramic image as the target. The position and/or range set as the target may be any position and/or range. For example, the target may be a position and/or a range where some information is presented to the user. Specifically, where additional information is displayed on a panoramic video, the information processing device 3 may set the position (and/or range) associated with additional information as the target. Then, with the guide information, it is possible to guide a user to move the display range so that additional information is displayed in the display range. Note that the image shown in FIG. 17 is an example of an image to be displayed when the position of a comment, which is an example of additional information, is set as the target. History-related information produced from history information is information that can possibly be additional information, and the position associated with history-related information which is additional information may be set as the target. Note that history information represents an operation by a user while a panoramic video is played and/or information determined by such an operation, details of which will be described later.

The information processing device 3 may set a position (or range) specified by another user different from the user of the terminal device 2 as the target. That is, the information processing device 3 may set, as the target, a range or a position specified by an input made on another input device (the controller device 7) different from the input device (the terminal device 2) used for controlling the display range. For example, where a panoramic video is displayed on another display device (the monitor 4) different from the display device (the LCD 11) of the terminal device 2, the information processing device 3 may set a position (and/or range) on a panoramic video displayed on the other display device based on an input made on the other input device. Then, the specified position (and/or range) is set as the target.

Figure 18:
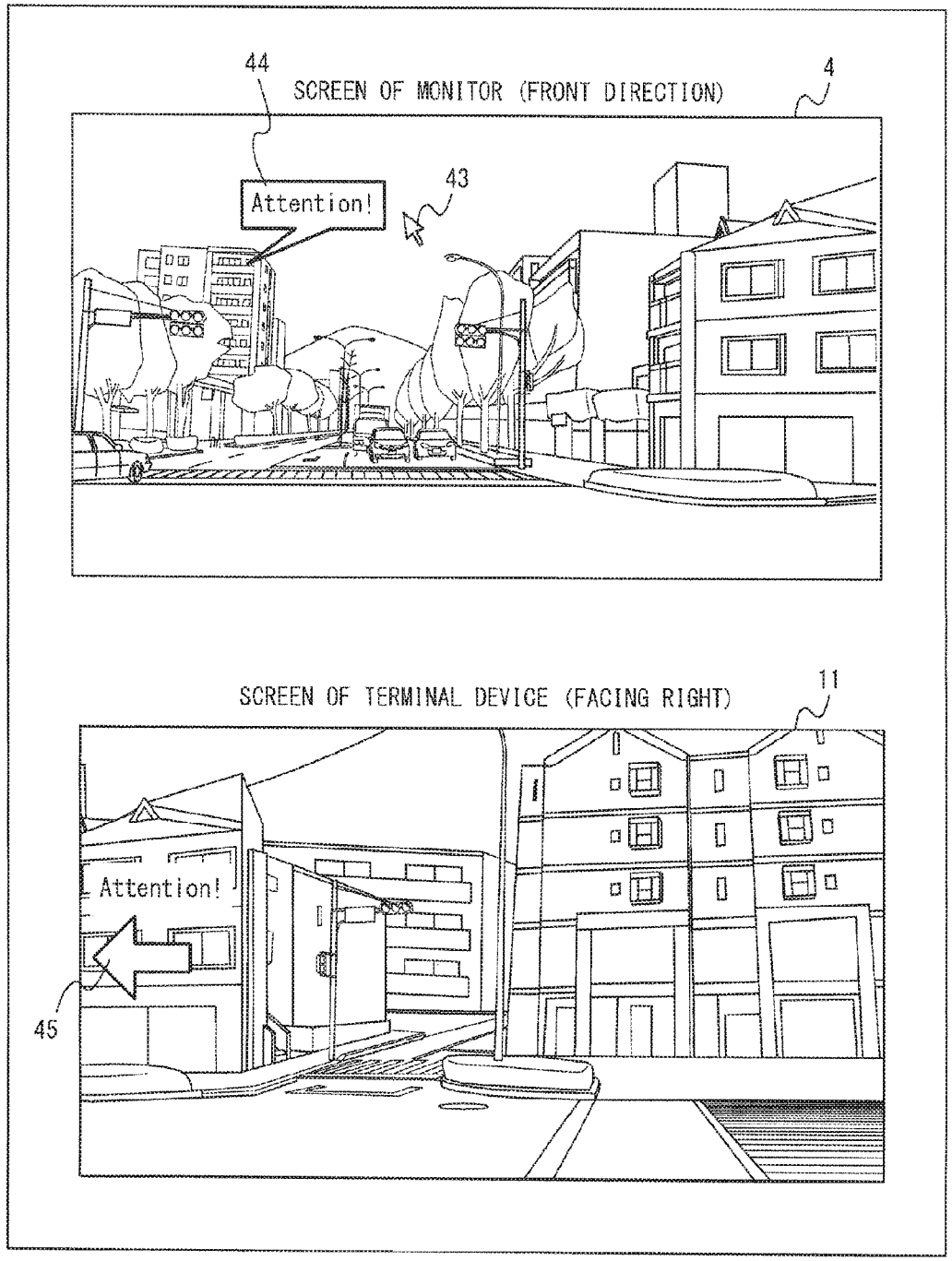
FIG. 18 shows an example of an image displayed on each display device where a target is set on another display device.

FIG. 18 shows an example of an image displayed on each display device where a target is set on another display device. In FIG. 18, a cursor 43 is displayed together with a panoramic video on the monitor 4. The cursor 43 is controlled by the controller device 7. Another user using the controller device 7 moves the cursor 43 to an intended position, and performs a predetermined operation (e.g., an operation of pressing a button of the controller device 7). The information processing device 3 sets, as the target, a position on a panoramic image at the point in time when the predetermined operation was performed. Note that while the operation of setting the target using the cursor 43 is described as an example in the present embodiment, the method of operation for setting the target may be any method. While an image (image representing "Attention!") 44 representing additional information is displayed at the position of the target in FIG. 18, such an image does not need to be displayed. When the target is set, the information processing device 3 outputs (displays) guide information associated with the target on the terminal device 2. For example, in FIG. 18, since the target is set to the left with respect to the display range on the terminal device 2, a guide image 45 representing an arrow indicating the left direction is displayed as guide information on the terminal device 2.

Where the target can be set by an input made on the other input device as described above, another user different from the user using the terminal device 2 can set the target. For example, if another user inputs a "recommended location" as the target using another input device, it is possible to let the user of the terminal device 2 know of the "recommended location".

Where the position (and/or range) on a panoramic video displayed on the other display device can be specified as the target, guide information for the target specified on the screen of one display device can be output on another display device. Therefore, a user who sets a target can easily set a target at a location outside the display range which is being seen by another user. Note that in other embodiments, the information processing device 3 may set a position (and/or range) to be the target based on an input made on the terminal device 2, and display guide information associated with the set target on the monitor 4. Effects similar to those described above can be achieved also in this manner.

An object to be set as the target is not limited to a position on a panoramic image, but may also be a range. For example, the information processing device 3 may set, as the target, a display range used in a separate instance of playback of a panoramic video. Herein, "a separate instance of playback of a panoramic video" refers to a panoramic video being played in a separate instance from that in which the display range is determined in accordance with an operation by a user (playback on the terminal device 2 in the present embodiment). For example, if a panoramic video has been played in the past, that can be referred to as "a separate instance of playback of the panoramic video". When a panoramic video is played on another display device (e.g., the monitor 4) different from the display device (e.g., the terminal device 2) on which the display range is determined in accordance with an operation by a user, that can be referred to as a separate instance of playback of the panoramic video". As described above, a display range used in a separate instance of playback of the panoramic video may be set as the target, and guide information associated with the display range may be output.

Figure 19:
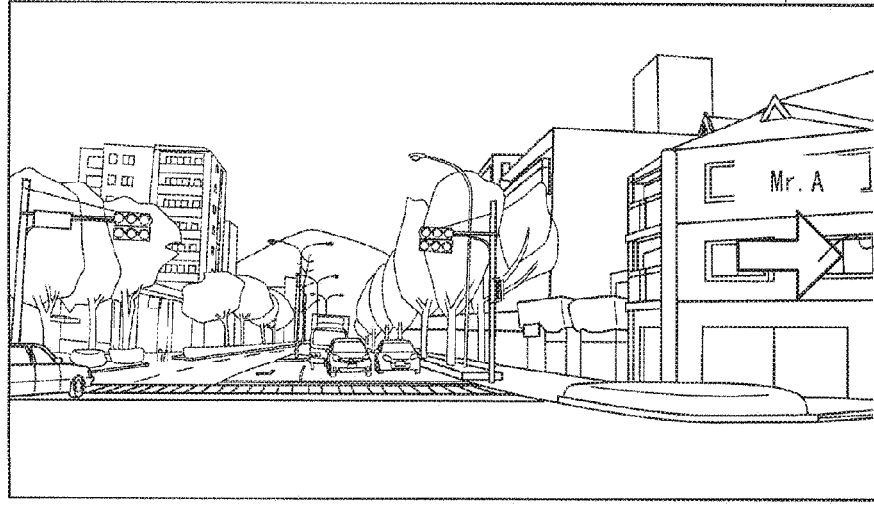
FIG. 19 shows an example of an image displayed on each display device where a display range is set as a target.
Figure 19:
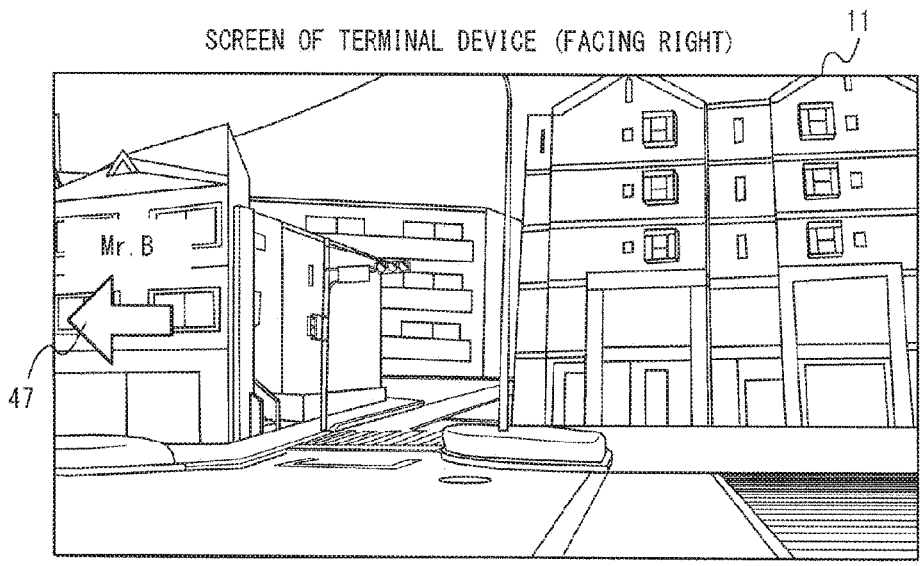

FIG. 19 shows an example of an image displayed on each display device where a display range is set as the target. In FIG. 19, a panoramic video of a display range such that the viewing direction of the virtual camera 22 is facing in the front direction is displayed on the monitor 4, and a panoramic video of a display range such that the viewing direction is facing right with respect to the front direction is displayed on the terminal device 2. Therefore, on the terminal device 2, a guide image 47 representing an arrow indicating the left direction, which is the direction toward the display range of the monitor 4 with respect to the display range on the terminal device 2, is displayed as guide information. On the monitor 4, a guide image 46 representing an arrow indicating the right direction, which is the direction toward the display range of the terminal device 2 with respect to the display range on the monitor 4, is displayed as guide information. Therefore, when a panoramic video is displayed on another display device different from a display device, the information processing device 3 may set, as the target, the display range displayed on the other display device. Note that while each of the two display devices is outputting guide information associated with the display range on the other display device in FIG. 19, the guide information may be output only one of the display devices.

The information processing device 3 may set, as the target, a display range used when a panoramic video was played in the past. For example, the display range used when a panoramic video was played in the past can be identified based on history information to be described later. The information processing device 3 may set, as the target, the display range identified based on the history information. That is, the information processing device 3 may output, together with a panoramic video, guide information representing a direction facing the display range when the panoramic video was played in the past, with respect to the current display range (see FIG. 21). Note that history-related information to be discussed below in "(history-related information representing the direction of the display range)" is one of guide information.

As described above, where a display range in a separate instance of playback of a panoramic video is set as the target, a user can be notified of a display range that another user was seeing (or is seeing), and the user can be guided to directing the display range of the user toward the display range of the other user.

(4-2) Storing Target Information

When the target is set, the information processing device 3 stores target information representing the set target. In the present embodiment, target information includes target position information and target period information. Target position information is information with which it is possible to identify the position and/or range set as the target. The position and/or range set as the target can be represented in a similar manner to the range information (input range information) described above, and it may be represented by information of a vector representing the attitude (viewing direction) of the virtual camera 22 or as a range and/or position on the three-dimensional model 21, for example.

Target period information is information with which it is possible to identify the period in which the target is set. For example, the target period information may represent the start point and the end point of that period, or may represent the point in time when the target was set (if the period can be set based on the point in time). The period in which the target is set can be represented in a similar manner to the time information described above, and it may be represented by the frame number of the panoramic image, for example.

Note that where the target to be set is associated with the additional information described above (where the target is set at the position of additional information), the information processing device 3 may set the target information based on input information associated with additional information. That is, target position information may be set based on input range information included in input information. Target period information may be set based on time information included in input information. Moreover, input range information may be used as it is as target position information, and the time information may be used as it is as the target period information. Then, the information processing device 3 does not need to additionally store target information separately from the input information (by storing input information, target information can be assumed stored).

(4-3) Method for Determining Output of Guide Information

In the present embodiment, the timing for outputting guide information is determined based on the period in which the target associated with the guide information is set. While the specific method for determining the timing may be any method, the information processing system 1 displays guide information during the period described above in the present embodiment. Note that guide information may be displayed, starting a predetermined amount of time before the period and ending at the end of the period.

In the present embodiment, where the target is located within the display range, guide information associated with the target is not output. For example, where additional information is displayed within the current display range, guide information associated with the additional information is not displayed. Therefore, it is possible to display a panoramic video and additional information in an easy-to-view manner without displaying unnecessary guide information.

Where a plurality of targets are set in a panoramic video, the information processing system 1 may output guide information for each target that satisfies a predetermined condition. The predetermined condition may be, for example, the target being one that is set by a particular user (e.g., one associated with additional information input by the particular user), the target being one of a particular type (e.g., one associated with additional information of a comment), the target being one that is set within a predetermined range with respect to the current display range, or the like. Thus, since guide information is output only for targets that satisfy the condition, it is possible to reduce the number of pieces of guide information to be output, and to display a panoramic video in an easy-to-view manner. Note that the predetermined condition may be specified by the user, for example.

In the present embodiment, the guide information represents the direction toward the target (the range and/or position set for the target) with respect to the current display range (see FIG. 17). The information processing device 3 determines the direction based on the current display range and the range and/or position set for the target. For example, the direction can be calculated by using a vector representing the viewing direction of the virtual camera 22. More specifically, the direction can be calculated as a direction toward a vector representing the position set for the target (or the center position of the range set for the target) with respect to a vector representing the center position of the current display range.

(4-4) Manner of Outputting Guide Information

Guide information is an image and/or a sound representing the relationship between the display range and the target. In the present embodiment, guide information is output, which represents the direction toward the target with respect to the display range, as described above. While guide information is the guide image 41 representing an arrow as shown in FIG. 17 in the present embodiment, guide information may be output in any manner of output such that it is possible to notify the user of the direction. For example, in other embodiments, the information processing system 1 may output a sound representing the direction together with an image representing the direction (or instead of the image). Note that the sound is output from the terminal device 2 and/or the monitor 4. The user may be made to guess the direction toward the target with respect to the display range, using an image of a map to be described later (see FIG. 25). With the guide image of the present application, it is possible to present the direction of the target with respect to the display range in an intuitive and easy-to-understand manner.

In the present embodiment, the information processing device 3 may output user information together with guide information. User information to be output represents the user who has input additional information associated with guide information. For example, in FIG. 17, a user image 42 representing the name (Mr. A) of the user who has input a comment is displayed together with the guide image 41. Thus, a user can decide whether or not to see the comment (i.e., whether or not to move the display range toward that comment) based on who is the user who has input the comment.

The information processing device 3 may output information representing the type of the target, together with the guide information. For example, in FIG. 17, an image representing the type of the target (an image representing the "comment of Mr. A") 42 is displayed together with the guide image 41. The type of the target is, for example, the type of information to be output when the position and/or range of the target is included within the display range. Specifically, information representing the type of the target may be the type regarding the content to be output, e.g., "comment" or "rating information", or it may be the name of the person who has input the information, e.g., "Mr. A" or "Mr. B". Thus, it is possible to notify the user of the information which has been set as the target. The user can know the type of the information to be output at the location of the target, before actually moving the display range to the target.

Note that where the position of additional information moves on a panoramic image, the target associated with additional information is also moved in accordance with the movement of additional information. Then, the information processing system 1 changes the direction represented by guide information in accordance with the movement of the target (additional information). That is, while guide information is output, the information processing system 1 may repeatedly calculate the positional relationship between the display range and the target at that point in time, and repeatedly calculate the direction represented by guide information based on the positional relationship. Thus, even when the target moves, it is possible to output guide information representing an accurate direction following the movement.

(4-5) Output Destination of Guide Information

In the present embodiment, guide information is displayed on the display device (the terminal device 2) where additional information is displayed (see FIGS. 17 and 18). Therefore, when moving the display range by controlling the terminal device 2, the user can recognize guide information, and therefore it is possible to allow the user to more certainly recognize guide information. Note that in other embodiments, guide information may be displayed on a different display device (the monitor 4) from the display device where additional information is displayed. Thus, a panoramic video displayed on the terminal device 2 can be presented in an easy-to-view manner. In other embodiments, guide information may be displayed on both of the two display devices.

(4-6) Content of Additional Information Associated with Guide Information

Where a target is set associated with additional information, the content of additional information associated with guide information is not limited to the additional information which has been input by a user. Additional information associated with guide information may be any information that is output together with a panoramic video when a condition regarding the display range and the playback time point during the playback of the panoramic video is satisfied. That is, additional information may be any information that is output together with a panoramic video when the panoramic video has reached a predetermined playback time point and the display range includes a predetermined range. For example, additional information may be information that is obtained from an external device as described in (3-4) above, or may be information that is pre-registered in a panoramic video. The history-related information to be described later is a type of additional information, and guide information may be set for the history-related information.

5. Output Reflecting Another Instance of Playback of Panoramic Video

In the present embodiment, the information processing system 1 can output a panoramic video while reflecting the playback content from "a separate instance of playback of the panoramic video" described above. Note that the playback content is a concept including a display range of a panoramic video, and a position in the display range (e.g., a position specified by a user). For example, the information processing system 1 can output, together with a panoramic video, information based on a history obtained when a panoramic video was played in the past. Where one panoramic video is played simultaneously on a plurality of display devices, for example, the information processing system 1 can output information representing the display range being played on another display device to a different display device together with a panoramic video. As described above, in the present embodiment, the information processing system 1 outputs the current instance of playback of the panoramic video while reflecting the playback content from a separate instance of playback of the panoramic video in the past or on another device. Thus, it is possible to present, to a user, more information when displaying a panoramic image. For example, it is possible to present, to a user, interesting pieces of information such as where in a panoramic video another user was seeing.

Output modes of outputting a panoramic video while reflecting the playback content from a separate instance of playback of a panoramic video include the first output mode in which the playback content from a past instance of playback is reflected, and the second output mode in which the playback content from a concurrent (real-time) instance of playback on another device is reflected. The first output mode is an output mode in which the playback content from a past instance of playback of a panoramic video is reflected in a later instance of playback of the panoramic video. The second output mode is an output mode in which where the same panoramic video (different display ranges may be used) is played on at least two display devices, the playback content from one display device is reflected in the playback of the panoramic video on the other display device. The first output mode and the second output mode will now be described.

(5-1) First Output Mode

In the first output mode, the information processing system 1 stores, as history information, information regarding the display range during playback of a panoramic video, and outputs based on the stored history information when the panoramic video is played thereafter (second and third playback modes to be described later). That is, the information processing device 3 obtains the range information described above while a panoramic video is played, and stores the range information, as history information, in a storage unit that can be accessed by the information processing device 3. Then, after the history information is stored, the information processing device 3 outputs information based on the history information.

As described above, in the present embodiment, the display range controlled by a user while a panoramic video is played can be stored as history information. Thus, it is possible to output in accordance with the history information while playing a panoramic video. For example, the information processing device 3 can produce additional information based on history information to output additional information together with a panoramic video, or play a panoramic video controlling the display range based on a history. Thus, a user can know which places in the panoramic video are much seen, and/or which locations in the panoramic video have been seen by another user, for example. That is, according to the present embodiment, it is possible not only to simply present a panoramic video, but also to present information interesting to a user together with a panoramic video. How a history is stored and how a panoramic video is played based on the history will now be described in detail.

(5-1-1) Storing History Information

Figures 20, 21:
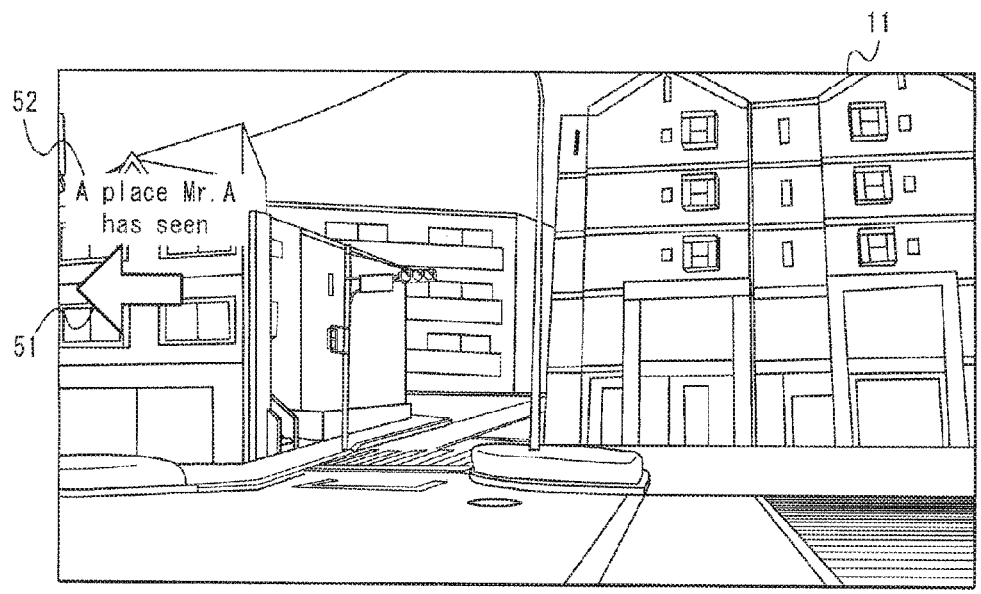
FIG. 20 shows an example of history information.
FIG. 21 shows an example of an image of history-related information.

The information processing system 1 stores history information described above while a panoramic video is played. In the present embodiment, the information processing system 1 stores history information, in which time information with which it is possible to identify a playback time point in a panoramic video is associated with range information with which it is possible to identify a display range at the playback time point or a position within the display range. History information is stored in the storage unit described above (herein, the memory 6). FIG. 20 shows an example of history information. As shown in FIG. 20, history information includes a plurality of pairs of the time information and the range information. In the present embodiment, time information is information representing a frame number of a panoramic image, and range information is information of a vector representing the attitude of the virtual camera 22. While a pair of time information and range information is stored for every frame of a panoramic video in the present embodiment, such pairs in other embodiments may be stored at predetermined time intervals or only for key frames, or such a pair may be stored at a point in time when a predetermined condition is satisfied. By storing history information in which time information and range information are associated together as described above, it is possible to identify a display range at each playback time point in a panoramic video.

As shown in FIG. 20, in the present embodiment, user information representing a user who is associated with history information is stored while being associated with history information. Note that "a user associated with history information" is the user who has performed an operation for a display range that is represented by the history information. While user information may be any information with which it is possible to identify a user, the pre-registered name of the user is stored as user information in the present embodiment.

Note that in other embodiments, history information may include information other than those described above. For example, history information may include information representing the size of a display range (zoom information). History information may also include information (referred to as playback control information) representing a playback-related operation performed by a user while a panoramic video is played. For example, playback control information is information representing an operation such as pause, rewind, fast-forward, etc., of the playback of a panoramic video. Playback control information may further include a playback time point at which such an operation has been performed. In some cases, a panoramic video is of a multi-camera type. With a multi-camera type, a plurality of panoramic videos of a single space as viewed from different viewpoints are prepared, and the viewpoint can be switched from one to another while playing the panoramic video. In such a case, information of the viewpoint may be stored while being included in the history information. Where a comment (additional information) described above is input by a user, the input information and the history information described above may be stored while being associated with each other. That is, the input information may be stored as a part of the history information.

(5-1-2) Playing Panoramic Video Using History Information

The information processing system 1 can play a panoramic video based on the history information. That is, the information processing system 1 outputs a panoramic video while changing the output content (display mode) thereof in accordance with the history information. Thus, it is possible not only to simply present a panoramic video, but also to present history information (or information based on history information) to a user. Now, methods for outputting a panoramic video while changing the output content thereof in accordance with the history information may include (A) to (C) below, for example.

(A) Method of Outputting History-Related Information

In the present embodiment, the information processing system 1 can output, together with a panoramic video, information produced based on history information. Hereinafter, information produced based on history information will be referred to as "history-related information". The information processing system 1 produces various history-related information to be described below from history information, and outputs the history-related information when a panoramic video is played. Thus, a user can obtain information regarding the history of another user by seeing the history-related information while a panoramic video is played.

(History-Related Information Representing Direction of Display Range)

FIG. 21 shows an example of an image of history-related information. The history-related information shown in FIG. 21 presents, to a user, the direction of a display range identified by the history information. That is, in FIG. 21, an image 51 representing the direction of the display range identified by the history information (range information included in history information) with respect to the current display range is displayed as history-related information. Note that the image 51, which is history-related information, can also be said to be guide information described above.

Specifically, the information processing system 1 identifies a range or position on a panoramic image based on one of the range information included in the history information that is associated with the time information corresponding to the current playback time point. Then, the direction of the calculated range or position is calculated with respect to the current display range. Note that this direction can be calculated by a method similar to that for a direction represented by guide information described above. The information processing system 1 displays the image 51 representing the calculated direction on the terminal device 2. Note that the image 51 is displayed at a position determined in accordance with the calculated direction on the screen of the LCD 11 (at a position on the left side of the screen in FIG. 21 since the calculated direction is left).

As the image 51 is presented, a user can know where in a panoramic video another user was seeing with respect to a display range that the user is currently seeing. Where a user wishes to know a location that has been seen by another user, the user can move the display range in the direction represented by the image 51 so as to see the same location as the location which has been seen by the other user. Note that in the example shown in FIG. 21, where the current display range (partially) overlaps a display range identified by history information, an image may be displayed for notifying the user of such an overlap.

In FIG. 21, together with the image 51 representing history-related information, an image 52 representing user information associated with history-related information (user information stored while being associated with history information) is displayed. Thus, a user can identify the user who was seeing the display range identified by the history-related information. Now, the panoramic video is a video whose area cannot be contained within one screen, and the display range on the terminal device 2 can be freely controlled by the user. Therefore, since the position of the display range and the transition thereof differ from one person (user) to another, history information of the display range can be said to reflect the personality of the user, and such history information can be information that is useful for (interesting to) other users. Therefore, by presenting user information together with history information, it is possible to improve the level of interest of a user to the panoramic video, and to motivate the user to view the panoramic video many times. Note that also in other display modes (FIGS. 22 and 23) in which other contents are displayed as will be described later, user information may be displayed together with history-related information.

(History-Related Information Representing Display Frequency)

Figure 22:
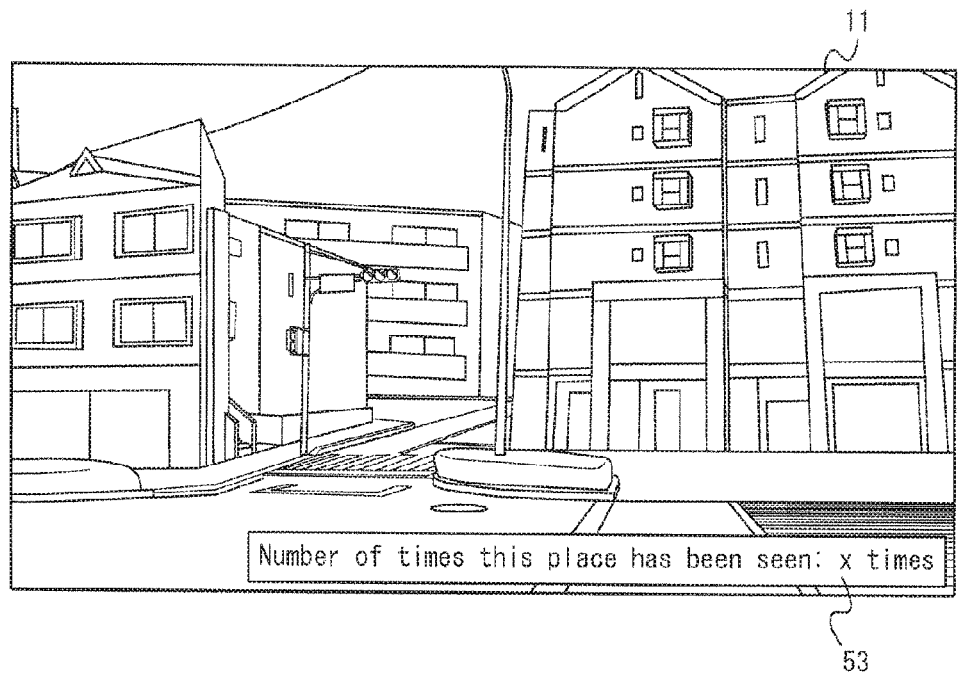
FIG. 22 shows another example of an image of history-related information.

FIG. 22 shows another example of an image of history-related information. The history-related information shown in FIG. 22 presents, to a user, the display frequency for a predetermined range on a panoramic image obtained from the history information. In FIG. 22, an image 53 is displayed as history-related information, representing the number of times the current display range has been displayed in past instances of playback of the panoramic video. Note that the image used for presenting the display frequency to a user may by any image, other than the image 53, which represents the number of times. The information processing device 3 may display, together with the panoramic video, user information (e.g., a character representing each user) for each position and/or range obtained from the range information included in the history information, for example. Thus, since a number of pieces of user information are displayed in accordance with the number of times the current display range has been displayed in past instances of playback of the panoramic video, the user can know how many or how few the number of times is based on the number of pieces of user information displayed.

Where the number of times is calculated as the display frequency, the information processing system 1 first selects one of the range information included in the history information that is associated with the time information corresponding to the current playback time point. Then, a range or position on a panoramic image is identified based on the selected range information, and it is determined whether the identified range or position is included within the current display range. The information processing system 1 makes the above determination for each piece of history information stored in the storage unit, and counts the number of pieces of history information for which the determination result is affirmative. The image 53, which represents the count obtained as described above, is displayed on the terminal device 2. The history-related information of the image 53 represents statistics obtained from a plurality of pieces of history information. The image 53 is displayed at a predetermined position on the screen of the LCD 11. Note that the information processing system 1 may update the image 53 repeatedly (e.g., every frame).

The number of times is the number of pieces of history information, among the one or more pieces of history information stored, that satisfy the condition regarding time information (the time information corresponding to the current playback time point) and the condition regarding range information (the range or position represented by the range information being included within the current display range). Therefore, it is possible to calculate the display frequency over a plurality of instances of playback of the panoramic video, and it is possible to present the display frequency to the user. That is, as the image 53 is presented, a user can know how much the display range the user is currently seeing has been seen by other users. For example, a user can play the panoramic video while setting the display range to a range that is popular (frequency seen by other users) or while setting the display range to a range that is not frequency seen by other users. With the image 53, it is also possible to present, to the user, statistical information based on a plurality of users (or a plurality of views).

Figure 23:
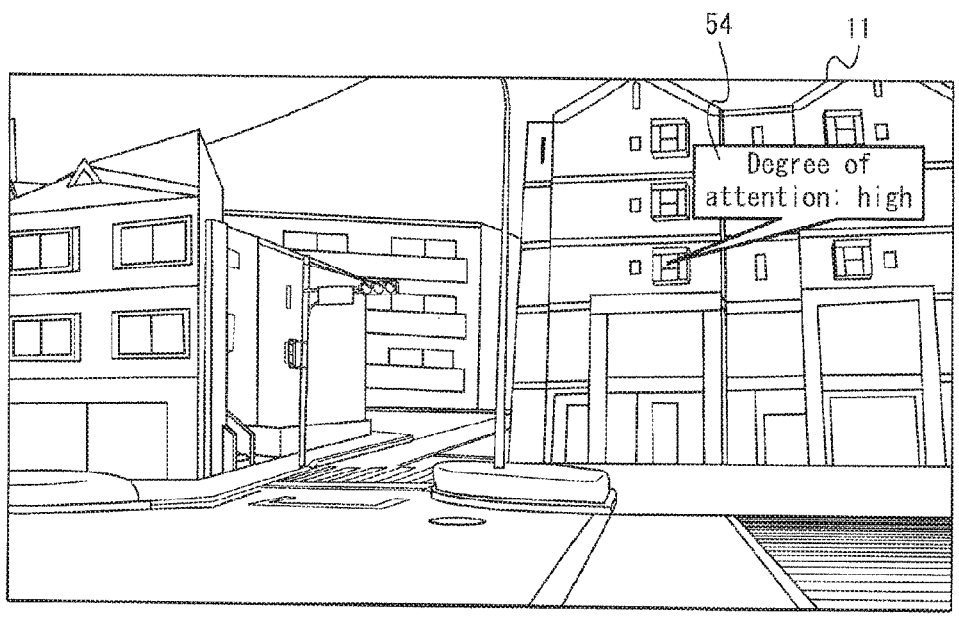
FIG. 23 shows another example of an image of history-related information based on history information.

Note that the display frequency calculated from history information is not limited to a display frequency calculated for a plurality of instances of playback of the panoramic video, but may also be a display frequency calculated for a single instance of playback of the panoramic video. That is, the display frequency may represent how much a predetermined range in a panoramic image has been seen during a single instance of playback of the panoramic video. FIG. 23 shows another example of an image of history-related information based on history information. The history-related information shown in FIG. 23 relates to an object represented by the object information described above, and represents how much the object (the range of the object) has been seen (displayed) in a single instance of playback of a panoramic video. That is, in FIG. 23, for an object within the current display range, an image 54 representing the display frequency (degree of attention) of the object determined based on history information is displayed as history-related information. Note that as shown in FIG. 23, the image 54 representing history-related information is displayed while being associated with a position (range) of the object associated with the history-related information. As the image 54 is presented, a user can know how much attention the object was drawing when other users played the panoramic video.

Where the display frequency is calculated for a single instance of playback of the panoramic video, the information processing system 1 calculates the number of pieces of range information included in the history information that satisfy a predetermined condition regarding the position on the panoramic image. Specifically, in the present embodiment, the information processing system 1 determines whether the object is included within the display range identified by the range information for each piece of range information included in the history information. Note that this determination can be made based on each piece of range information and the object information. The information processing system 1 counts the number of pieces of range information for which the determination result is affirmative, and determines the degree of attention in accordance with the obtained count. For example, where the count is greater than or equal to a predetermined number, the image 54 indicating that the degree of attention is high is output as history-related information while being associated with the object. On the other hand, where the count is smaller than a predetermined number, another image indicating that the degree of attention is low may be output as history-related information, or no history-related information may be output.

Note that in other embodiments, history-related information may be calculated representing the display frequency (degree of attention) of an object over a plurality of instances of playback of the panoramic video. Then, the information processing system 1 performs the process of calculating the number of range information for each piece of history information stored in the storage unit.

The display frequency represented by history-related information only needs to represent the display frequency for a predetermined range in a panoramic image, and the predetermined range may be a display range or a range of an object.

The display frequency (degree of attention) may be determined using the playback control information described above. For example, the information processing system 1 may determine that the degree of attention for an object included within the display range is high when the user paused the playback. Alternatively, the display frequency (or the degree of attention) may be determined to be high for a range that was displayed during a certain period that was rewound and played repeatedly, for example.

Note that history-related information may possibly be displayed at a particular position on a panoramic image, such as the image 54, for example. In such a case, the information processing system 1 may display history-related information so as to move following the movement of the object associated with the history-related information, as with the additional information described in (3-3-2) above.

In other embodiments, the information processing system 1 may output a sound representing history-related information, in addition to or instead of displaying an image representing history-related information. Note that the sound is output from the terminal device 2 and/or the monitor 4.

(Output Destination of History-Related Information)

In the present embodiment, history-related information is also displayed on the terminal device 2, as with the additional information described above in [3. Inputting comment by user], for example. Thus, it is possible to allow a user to more certainly recognize history-related information. Note that as with additional information, history-related information may also be displayed on the monitor 4. Thus, the panoramic video displayed on the terminal device 2 can be presented in an easy-to-view manner. In other embodiments, the information processing system 1 may display an entire panoramic image on the monitor 4, and display history-related information together with the entire panoramic image (while being superimposed on the entire panoramic image).

(B) Method of Playing Display Range Determined Based on History Information

In the present embodiment, the information processing system 1 can determine the display range based on history information, and play a panoramic video. Specifically, the information processing system 1 determines a display range at each playback time point (each frame) of a panoramic video based on the range information stored in history information. Then, a panoramic image of the determined display range is displayed on a display device. Thus, a user can play a panoramic video with the same display range as that when history information was stored.

In the present embodiment, the panoramic video of a display range determined based on history information is displayed on the monitor 4. On the other hand, a panoramic video of a display range determined based on a user input is displayed on the terminal device 2. Therefore, a user can see a panoramic video of an intended display range using the terminal device 2, and at the same time can see a panoramic video of a display range that has been seen by another user. Note that in other embodiments, the information processing system 1 can play a panoramic video of a display range determined based on history information simply on a single display device (the terminal device 2 or the monitor 4). In other embodiments, where an entire panoramic image or an image of the space represented by a panoramic image (e.g., a bird's-eye view or a map) is displayed on the monitor 4, history-related information may be displayed together with the image displayed on the monitor 4 (while being superimposed on the image).

Figure 24:
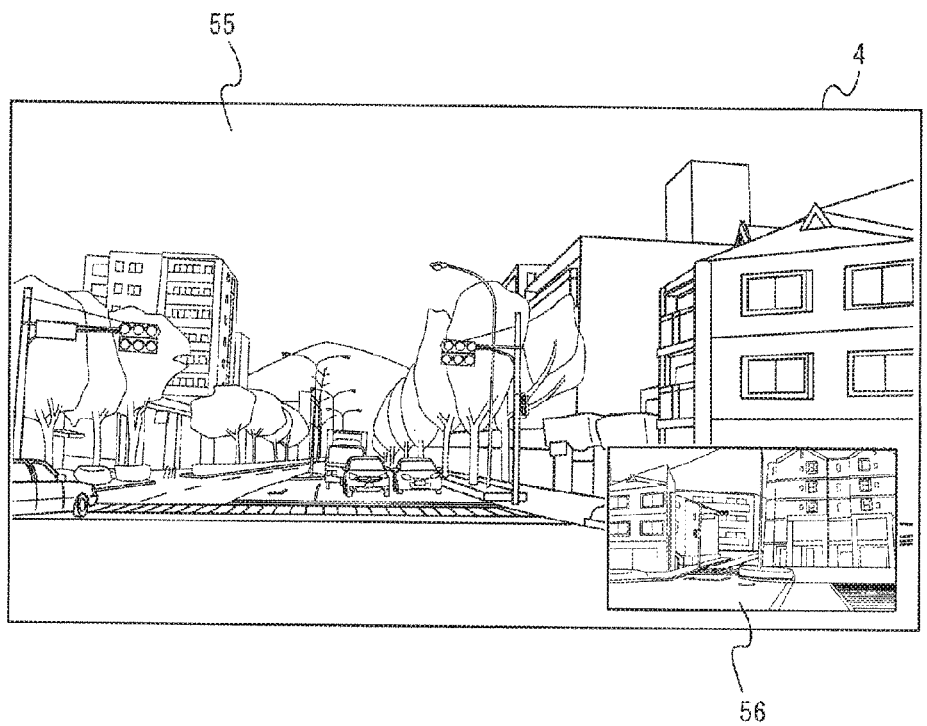
FIG. 24 shows an example case where a panoramic video of a display range determined based on history information is displayed on a monitor 4.

FIG. 24 shows an example case where a panoramic video of a display range determined based on history information is displayed on the monitor 4. In FIG. 24, a panoramic video 56 of a display range determined based on history information is displayed on the monitor 4, together with a panoramic video 55 of a display range such that the viewing direction of the virtual camera 22 is facing in the front direction. Thus, the panoramic video 56 of the display range based on history information may be displayed on a portion of the screen area of the monitor 4. The panoramic video 56 of the display range based on history information may be displayed on a portion of the screen area of the terminal device 2. For example, a plurality of display ranges may be determined from a plurality of pieces of history information, and the panoramic video of the determined display ranges (a plurality of panoramic videos) may be displayed on the monitor 4 and/or the terminal device 2.

The display range may be determined based on a plurality of pieces of history information. For example, the information processing system 1 may identify a display range with a high display frequency using a plurality of pieces of history information, and display a panoramic video of the identified display range.

(C) Method of Displaying Another Image Together with Panoramic Video

In other embodiments, the information processing system 1 may produce an auxiliary image based on history information, and display the auxiliary image together with a panoramic video. An auxiliary image is an image in accordance with the display range determined based on history information and, in other words, is an image that can make a user recognize the display range. An auxiliary image may be an image of a map (or a bird's-eye view) of the space represented by the panoramic video as viewed from above, for example.

Figure 25:
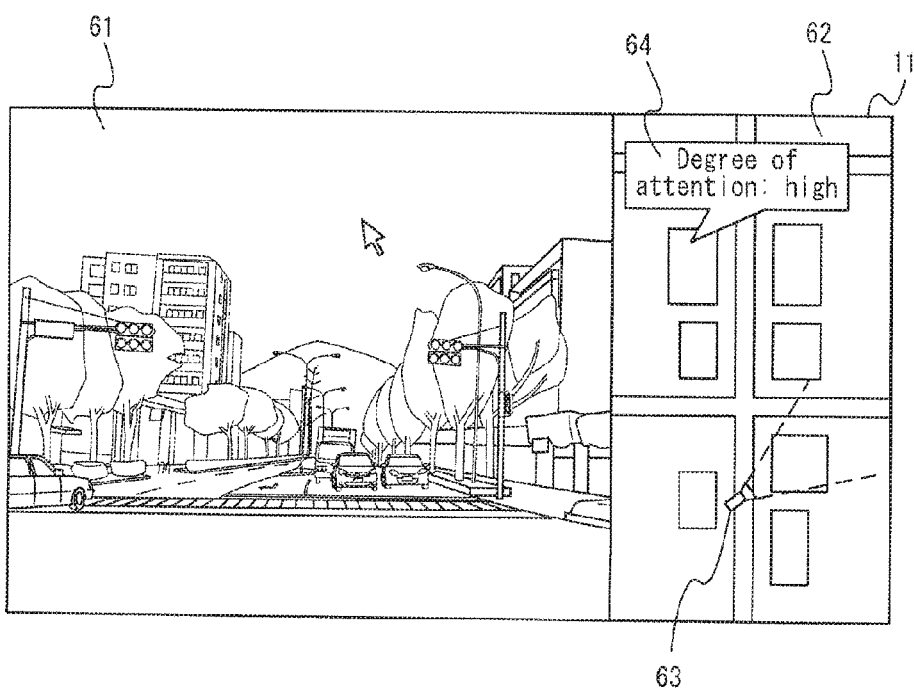
FIG. 25 shows an example case where an auxiliary image is displayed together with a panoramic video.

FIG. 25 shows an example case where an auxiliary image is displayed together with a panoramic video. In FIG. 25, a map image 62 of the space represented by a panoramic video is displayed as an auxiliary image on the terminal device 2, together with a panoramic video 61 of the current display range. The map image 62 is an image representing a map of the space represented by the panoramic video 61 as viewed from above. The map image 62 includes a viewpoint image 63, for example. The viewpoint image 63 represents the position of the viewpoint on the map. That is, the viewpoint image 63 representing a camera is arranged at the position of the viewpoint on the map. Note that where the moving direction and the moving velocity of the viewpoint are known in advance, the position of the viewpoint on the map can be identified from the current playback time point (frame number).

The viewpoint image 63 represents the viewing direction on the map. That is, the viewpoint image 63 representing a camera is arranged so as to face in the viewing direction on the map. The viewing direction can be calculated from the display range determined based on history information (e.g., using the attitude of the virtual camera 22). Thus, the information processing device 3 may display, on a display device, an image (the viewpoint image 63) representing the viewing direction corresponding to the display range based on range information. Thus, it is possible to present, to a user, the direction in which another user was looking. Note that while the viewpoint image 63 represents the viewing direction corresponding to the display range based on the history information in FIG. 25, it may represent the viewing direction corresponding to a position based on the history information.

The map image 62 may include history-related information. For example, in FIG. 25, an image 64 indicating that the degree of attention is high is arranged on the map. Then, history-related information may or may not be displayed also on the panoramic video 61. Thus, the information processing device 3 may display, on a display device, an image representing the space represented by a panoramic video and a position in the space corresponding to a position based on range information (a position on the panoramic video. Herein, the position of history-related information).

Thus, the position represented by range information can be expressed by an image as viewed from a viewpoint different from the panoramic video, and it is possible to present the position to a user in an easier-to-understand manner.

Note that the position on the map of history-related information can be calculated from the position on a panoramic video of the history-related information. The position on the map may be calculated by any method. For example, information in which positions on a panoramic video (or attitudes of the virtual camera 22) and positions on the map are associated with each other may be provided in advance, so that a position on the map can be calculated from a position on the panoramic video based on the information. For example, where object information is provided, the position on the map for the object represented by the object information may be calculated in advance, the object may be identified from the position on the panoramic video, and the position on the map can be identified from the object.

Thus, a display range and/or history-related information based on history information may be represented by using a map image. A display range based on history information and/or history-related information may be displayed on another auxiliary image different from the panoramic video, so that the panoramic video can be displayed in an easy-to-view manner.

In other embodiments, the information processing system 1 may play a panoramic video by simultaneously using some of the methods (A) to (C) described above. For example, the information processing system 1 may display history-related information together with a panoramic video on the terminal device 2, while displaying a panoramic video of a display range determined based on history information on the monitor 4.

(5-1-3) Obtaining History Information

In the first output mode in which the playback content from a past instance of playback is reflected, the device for obtaining history information and the device for reflecting the history information may be the same device or may be different devices. That is, the information processing device 3 may obtain, as history information, range information regarding a panoramic video played on a display device that displays the panoramic video reflecting the history information. The information processing device 3 may obtain range information regarding a panoramic video played on another display device different from a display device that displays the panoramic video reflecting the history information. Then, the information processing device 3 may play the panoramic video using two display devices, as described in (B) above, for example. That is, while the panoramic video is displayed on the display device (the terminal device 2 in the present embodiment), the information processing device 3 may determine the display range based on an input made on a predetermined input device and display, on the other display device (the monitor 4 in the present embodiment), the panoramic video of the determined display range (FIG. 24).

The information processing system 1 may obtain history information from another device outside the information processing system 1, in addition to storing history information in response to an input made on the terminal device 2. Then, a panoramic video may be output while changing the output content thereof in accordance with the obtained history information. For example, the information processing device 3 may be capable of communicating with an external device via a network such as the Internet, in which case the information processing device 3 may obtain history information from the external device. Thus, a user can see, together with a panoramic video, information based on the history information of another user (e.g., a friend or a celebrity).

Note that where history information is obtained from an external device, the history information may include user information representing the user who has made the input represented by the history information. Then, the information processing system 1 may output user information when outputting the panoramic video. For example, when history-related information is output, user information may be output together with history-related information (see FIG. 20), or when the display range is determined based on history information, user information may be output together with a panoramic video of the determined display range.

(5-2) Second Output Mode

In the present embodiment, the information processing system 1 plays the same panoramic video on two display devices (the terminal device 2 and the monitor 4), where the playback content from one of the display devices is reflected in the playback of the panoramic video on the other display device (the fourth playback mode to be described below). That is, while the panoramic video is displayed on a display device (e.g., the monitor 4), the information processing device 3 outputs the panoramic video on another display device different from the display device (e.g., the terminal device 2). Then, when the panoramic video is played on the other display device (the terminal device 2), the information processing device 3 obtains the range information. Moreover, while the panoramic video is played on the other display device (the terminal device 2), the information processing device 3 displays the panoramic video on the display device (the monitor 4) while changing the output content thereof in accordance with the obtained range information.

Thus, where a plurality of users are simultaneously seeing a single panoramic video, it is possible to present, to a user, interesting information for the user, i.e., which locations in the panoramic video are seen by other users, together with the panoramic video. The second output mode in which the playback content from a concurrent instance of playback on another device is reflected will now be described in detail.

(5-2-1) Obtaining Range Information

In the second output mode, while a panoramic video is played, the information processing system 1 at least obtains range information. In the present embodiment, while a panoramic video is played on the terminal device 2 and the monitor 4, the information processing device 3 obtains range information regarding the playback on the terminal device 2. Note that in the second output mode, range information obtained from the playback on one display device is reflected in the playback on another display device in real time, and therefore time information does not need to be obtained. Note however that where the output content thereof is changed based on range information obtained in the past in addition to range information obtained at the current point in time, the information processing device 3 may obtain time information together with range information, as in the first output mode described above. The information processing device 3 may obtain one or more of user information, zoom information, playback control information, etc., together with range information.

(5-2-2) Playing Panoramic Video Using Range Information

The information processing system 1 plays a panoramic video based on range information. That is, the information processing system 1 outputs a panoramic video while changing the output content (display mode) thereof in accordance with range information. Therefore, it is possible not only to simply present a panoramic video, but also to present information (range information) regarding the playback content from another display device to the user. In the second output mode, the method for outputting the panoramic video while changing the output content thereof in accordance with the range information may be as follows, for example.

In the present embodiment, the information processing device 3 plays, on the monitor 4, a display range determined based on range information obtained from the playback on the terminal device 2. That is, an image of a panoramic video of the display range on the terminal device 2 is displayed in a partial area of the monitor 4. Specifically, while a panoramic video is displayed on the monitor 4, the information processing device 3 determines a display range based on an input made on a predetermined input device (the terminal device 2), and displays the panoramic video of the determined display range on the terminal device 2. Then, the information processing device 3 displays a panoramic video of a predetermined range on the monitor 4, while displaying a panoramic video of a display range based on the range information on the monitor 4. Then, for the image displayed on the monitor 4, a panoramic video of a display range based on range information may be displayed on a partial area of the monitor 4, together with the panoramic video 55 of a display range such that the viewing direction of the virtual camera 22 is facing in the front direction, as in FIG. 24, for example.

Thus, it is possible to check the playback content of the terminal device 2 by watching the monitor 4. Now, since the terminal device 2 is of a portable type, it is difficult for a plurality of people to see the display screen of the terminal device 2. In contrast, with the playback content of the terminal device 2 displayed on the monitor 4, another user other than the user of the terminal device 2 can easily check the playback content of the terminal device 2. Thus, the user of the terminal device 2 and the other user can easily communicate with each other, and the other user who does not control the display range, for example, can also sufficiently enjoy the panoramic video.

Note that where a panoramic video whose display range is controlled on the terminal device 2 is displayed on the monitor 4, another user will see the panoramic video of the display range which the other user does not operate. Then, if the display range changes significantly, the other user may find it difficult to see the panoramic video. For example, if the display range changes abruptly, and in similar cases, the other user may find it difficult to see the panoramic video. For example, where the display range moves as the terminal device 2 itself is moved as in the present embodiment, if there are small movements (shaking) of the display range due to shaking of a hand, the other user may find it difficult to see the panoramic video. Therefore, the information processing device 3 may display the panoramic video on the display device (the monitor 4) while reducing the change in the display range determined based on the range information. Therefore, it is possible to present a panoramic video that is easier to view for other users. Note that the method for reducing the change in the display range may be as follows, for example.

For example, a monitor virtual camera is set in the virtual world having the same viewpoint and the same viewing direction as those of a terminal device virtual camera for displaying the panoramic video on the terminal device 2, and the monitor virtual camera is operated with basically the same movement as the movement of the terminal device virtual camera. In the first control example, if the amount of change per unit time in the orientation of the terminal device 2 in the real space is less than a predetermined threshold value, or if a value (a value representing the acceleration or the angular velocity) output from a sensor (the acceleration sensor 14, the gyrosensor 15, etc.) for detecting the movement of the terminal device 2 is less than a predetermined threshold value, and in similar cases, the attitude of the monitor virtual camera is fixed, thereby preventing the relatively small shaking of the image due to shaking of a hand. Then, when the amount of change or the output value becomes zero or greater than or equal to the threshold value, the attitude of the monitor virtual camera is controlled so as to be closer to, or the same as, the attitude of the terminal device virtual camera.

In the second control example, if the amount of change per unit time in the orientation of the terminal device 2 in the real space is greater than or equal to a predetermined threshold value, or if a value output from a sensor for detecting the movement of the terminal device 2 is greater than or equal to a predetermined threshold value, and in similar cases, the movement of the monitor virtual camera is restricted so as to suppress relatively large changes in the viewing direction. Then, when the amount of change or the output value becomes less than the threshold value, the attitude of the monitor virtual camera is controlled so as to be closer to the attitude of the terminal device virtual camera.

In the third control example, the movement of the monitor virtual camera is controlled so as to follow the movement of the terminal device virtual camera at a predetermined rate, thereby suppressing the relatively small shaking of the image due to shaking of a hand or the relatively large changes in the viewing direction. Specifically, the viewing direction of the monitor virtual camera is controlled so as to always change toward the viewing direction of the terminal device virtual camera at a predetermined rate (e.g., 50%) with respect to the angular difference between the viewing direction of the terminal device virtual camera and the viewing direction of the monitor virtual camera.

By displaying, on the monitor 4, the image of the inner surface of the three-dimensional model described above as viewed from the monitor virtual camera whose attitude is controlled using one of the control examples described above or a combination thereof, it is possible to display, on the monitor 4, an image obtained by reducing the change in the viewing direction in the panoramic video displayed on the terminal device 2.

An example has been described above for reducing the change in the movement of the display range in a case where a panoramic video being displayed on one display device is displayed on another display device. Note that in other embodiments, it is possible to reduce the change in the display range when the display range is enlarged or shrunk. For example, when a user holding the terminal device 2 performs an operation of enlarging or shrinking a panoramic video being displayed on the terminal device 2, the panoramic video enlarged or shrunk in accordance with the operation is displayed as it is on the LCD 11. On the other hand, where a panoramic video which is displayed on the terminal device 2, having been enlarged or shrunk in accordance with the operation performed on the terminal device 2, is displayed also on the monitor 4, if the enlargement factor or the shrinkage factor of the panoramic video is greater than a predetermined threshold value, a panoramic video in which the enlargement factor or the shrinkage factor have been suppressed to the threshold value is displayed on the monitor 4. Where the amount of time from when the panoramic video is enlarged to when it is shrunk in accordance with an operation performed on the terminal device 2, or the amount of time from when it is shrunk to when it is enlarged, is within a predetermined length of time, a panoramic video is displayed on the monitor 4 while suppressing the shrinking or the enlargement which has been done within the predetermined length of time. By displaying, on the monitor 4, a panoramic video in which the enlargement or the shrinkage is controlled by using one of the control examples or a combination thereof, it is possible to display, on the monitor 4, a panoramic video in which the change in the image enlarging or shrinking on the terminal device 2 is reduced.

Figure 26:
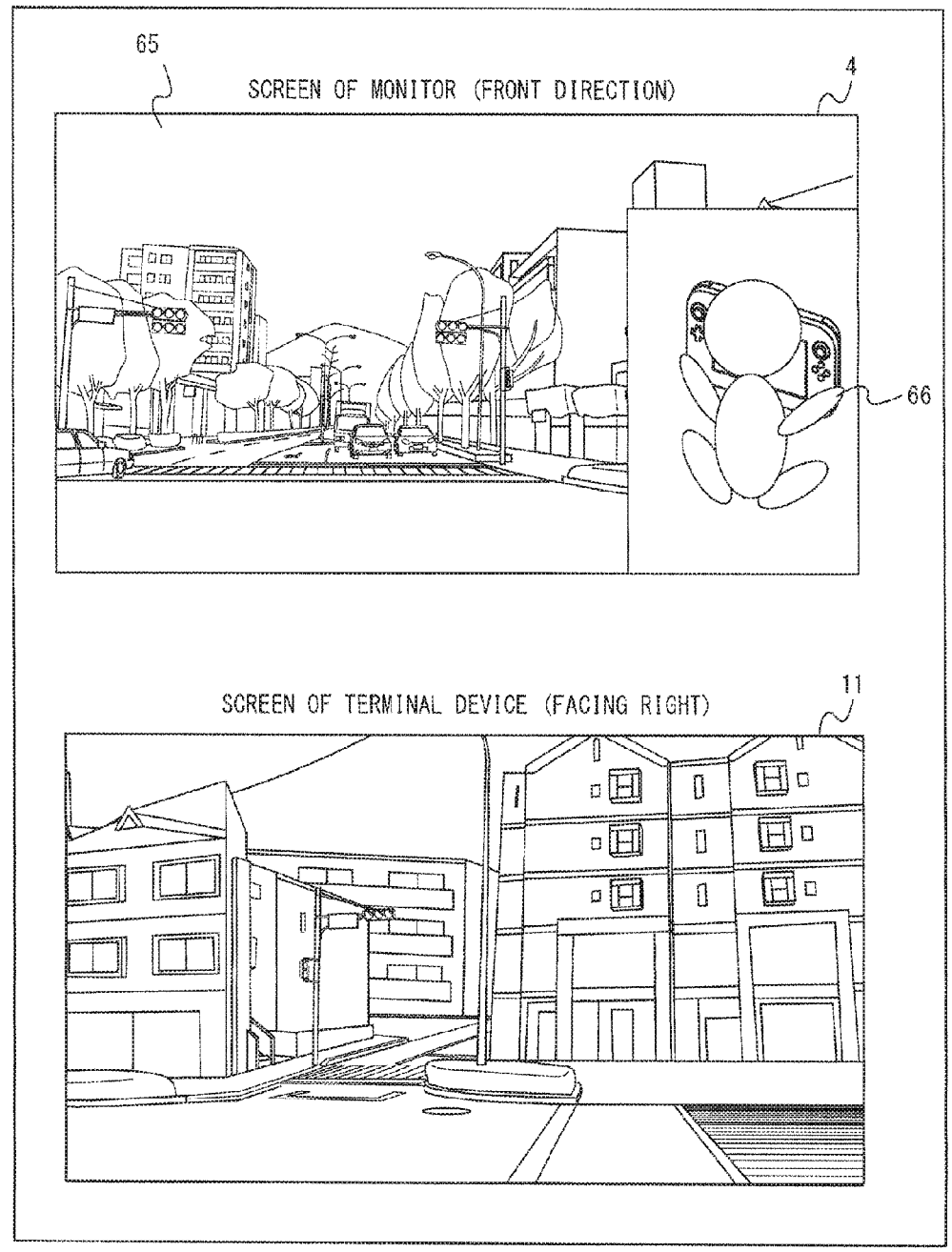
FIG. 26 shows an example of an image representing a viewing direction.

In other embodiments, the information processing device 3 may display, on a display device, an image representing the viewing direction corresponding to the display range or the position based on the range information, together with a panoramic video. FIG. 26 shows an example of an image representing the viewing direction. In FIG. 26, the panoramic video of a display range corresponding to the viewing direction in accordance with the attitude of the terminal device 2 (herein, a viewing direction that is slightly to the right with respect to the front direction) is displayed on the terminal device 2. An image 66 representing the viewing direction corresponding to the display range or the position based on the range information is displayed on the monitor 4, together with a panoramic video 65 of a display range obtained when the viewing direction of the virtual camera 22 is facing in the front direction. In the present embodiment, the image 66 representing the viewing direction shows a character holding the terminal device looking like a user of the terminal device 2. The attitude of the terminal device held by the character changes following the actual attitude of the terminal device 2. Since the attitude of the terminal device 2 corresponds to the viewing direction, it is possible to notify the user of the viewing direction by displaying the image 66 representing the attitude of the terminal device 2. Note that in FIG. 26, the direction of the character represented by the image 66 is controlled so that it is equal to the direction of the user of the terminal device 2. In contrast, in other embodiments, the direction of the character may be controlled so that it is opposite in the front-back direction to the direction of the user of the terminal device 2 (so that it is a mirror image of the user of the terminal device 2) so that it is easier to see the face of the character. In other embodiments, the map image 62 and the viewpoint image 63 may be displayed, as images representing the viewing direction, together with the panoramic video. Also in this manner, it is possible to notify the user of the viewing direction.

Figure 27:
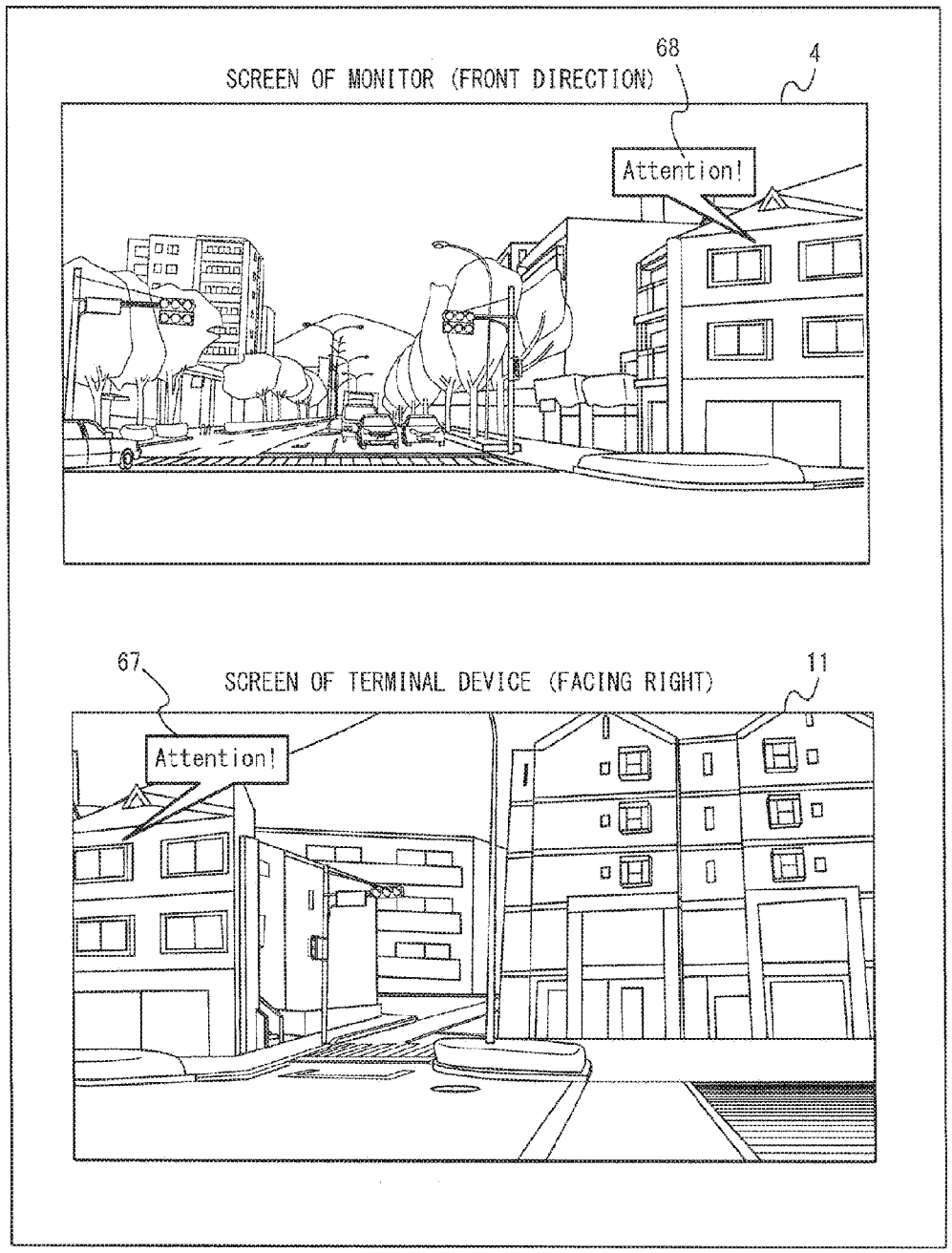
FIG. 27 shows an example case where an image representing a position based on range information is displayed together with a panoramic image.

In other embodiments, while a panoramic video is played, the information processing device 3 may obtain range information representing a position specified by a user, and display, on a display device, an image representing a position on a panoramic image determined based on the range information together with the panoramic video. For example, when additional information is input on a certain position on the panoramic video on the terminal device 2, the additional information may be displayed at the position also on the monitor 4. FIG. 27 shows an example case where an image representing a position based on range information is displayed together with a panoramic image. In FIG. 27, it is assumed that an image 67 representing additional information has been input and displayed within the display range of the terminal device 2. Then, the information processing device 3 obtains range information representing the position at which the additional information has been input within the display range. Then, the information processing device 3 displays an image 68 representing the additional information at the position represented by the obtained range information in the display range displayed on the monitor 4. Thus, a user can check additional information that has been input on the terminal device 2 also on the monitor 4, allowing another user other than the user of the terminal device 2 to check the additional information. Note that if the position represented by the obtained range information is outside the display range on the monitor 4, the image 68 is not displayed on the monitor 4. In such a case, the information processing device 3 may display a guide image described above on the monitor 4. The period over which the image 68 is displayed is determined based on the period over which the image 67 representing the additional information associated therewith is displayed on the terminal device 2. Therefore, the information processing device 3 may obtain time information representing the period in addition to obtaining range information representing the position at which the additional information has been input.

Note that the present embodiment is directed to an example where the playback content of the terminal device 2 is reflected on the monitor 4. In other embodiments, the information processing device 3 may reflect the playback content of the monitor 4 on the terminal device 2. For example, the information processing device 3 may display the panoramic image of the display range on the monitor 4 on the terminal device 2. For example, where a position within the display range on the monitor 4 can be specified by the controller device 7, the information processing device 3 can display, on the terminal device 2, an image representing a position specified within the display range on the monitor 4.

As described above, in the first output mode and the second output mode, while the panoramic video is played, the information processing device 3 obtains range information with which it is possible to identify a display range (and/or the position within the display range) that is determined based on an input made on a predetermined input device (the terminal device 2). Then, when a panoramic video is output by using a display device (the monitor 4), the panoramic video is output while changing the output content thereof in accordance with the obtained range information. Therefore, the playback content from past instances of playback of the panoramic video or other instances of playback of the panoramic video on other devices can be reflected in the output of the panoramic video currently played, and it is possible to present more information to a user while displaying a panoramic image.

(5-3) Output Based on History Information after Completion of Playback

Note that in the first output mode, range information is stored as history information. After the completion of playback of a panoramic video, the information processing device 3 may output information based on the history information obtained during the playback. For example, after the completion of playback, the information processing device 3 can present an object with a high display frequency during the playback of the panoramic video or a display range with a high display frequency over a plurality of instances of playback. Thus, it is possible to present, to a user, interesting information, i.e., where the user was seeing during the playback of the panoramic video.

For example, when the playback of a panoramic video is completed, the information processing device 3 may display, as a still image or a video, a panoramic image of a display range that is determined based on the range information stored as history information during the playback on a display device (the terminal device 2 and/or the monitor 4). An example of presenting a panoramic image of a display range determined based on history information after the completion of playback of a panoramic video will now be described.

Figure 28:
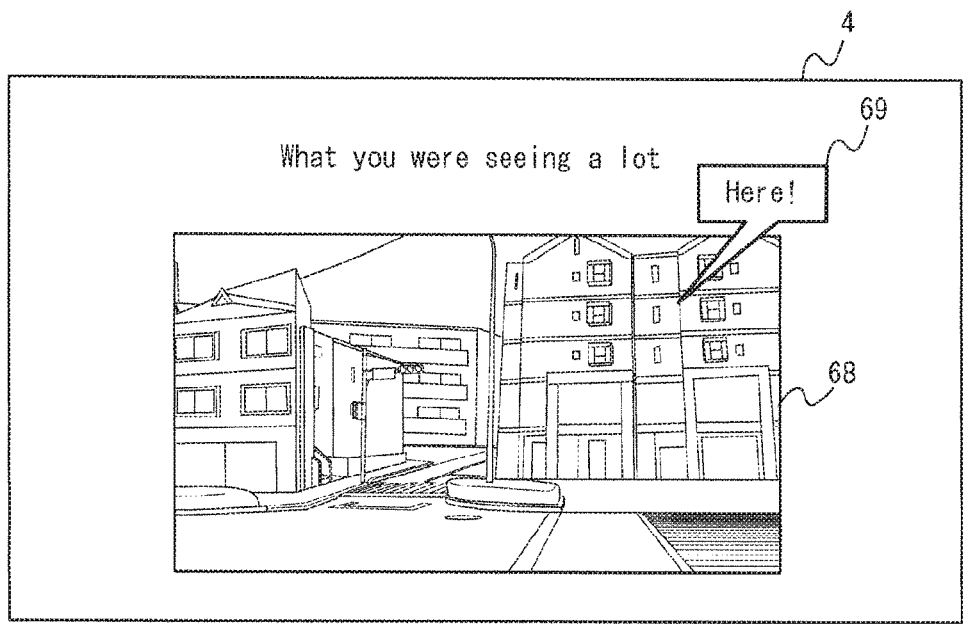
FIG. 28 shows an example of an image displayed after the completion of playback of a panoramic video.

FIG. 28 shows an example of an image displayed after the completion of playback of a panoramic video. In FIG. 28, the panoramic image 68 including an object with a high display frequency during the playback of the panoramic video is displayed on the monitor 4. Then, an image 69 pointing at the object may be displayed. Note that the information processing device 3 may display the panoramic image including the object as a still image or as a video. Thus, the information processing device 3 may display an object with a high display frequency during the playback of a panoramic video (i.e., a frequency seen object) after the completion of playback.

Specifically, the information processing device 3 obtains the range information as history information (during the playback of a panoramic video). Then, the information processing device 3 determines whether an object appearing in the panoramic video is included within the display range identified by the history information, and selects an object to be output in accordance with the determination result. Note that the determination may be made by using the history information and the object information described above, for example. For example, the information processing device 3 may calculate, through the determination described above, the display time for each of a plurality of objects appearing in the panoramic video, and select an object having a long display time (high display frequency). After the completion of playback of the panoramic video, the information processing device 3 displays the panoramic image of the display range including the selected object therein on a display device (e.g., the monitor 4).

In the above example, the information processing device 3 may obtain, as history information, range information representing an object with a high display frequency during the playback of a panoramic video, and identify the object represented by the history information after the completion of playback. Specifically, the information processing device 3 determines (while a panoramic video is played) whether an object is included within the display range during the playback of the panoramic video, and selects an object to be output in accordance with the determination result. Note that as with the first method, this determination can also be made by using the object information described above, for example. The information processing device 3 stores, as range information, information representing the selected object. Thus, where it is possible to identify a display range and/or a position within the display range on the panoramic video from information representing an object, the information representing an object may be stored as range information. After the completion of playback of the panoramic video, the information processing device 3 displays the panoramic image of the display range including the object represented by the range information on a display device (e.g., the monitor 4).

Where there are a plurality of pieces of history information, the information processing device 3 may display, as a still image or a video, the panoramic image of the display range determined based on a plurality of pieces of history information on a display device. For example, after the completion of playback of the panoramic video, the information processing device 3 identifies a range (or a position) with a high display frequency of the area of the panoramic video based on a plurality of pieces of history information. Then, the panoramic image of the identified display range is displayed on a display device (e.g., the monitor 4).

Note that in other embodiments, the information processing device 3 may display panoramic images of a plurality of display ranges for objects or display ranges in the descending order of display frequency. Then, a user can know the ranking of much-seen locations (objects) of the panoramic video. The information processing device 3 may display a panoramic image of an object or a display range with a low display frequency (e.g., a display range including an object that has never been displayed). Then, it is possible to notify the user of a location in the panoramic video that has been not so frequency seen.

As described in (5-1) to (5-3) above, in the present embodiment, the information processing system 1 changes the output content thereof in accordance with the range information obtained during the playback of a panoramic video, and outputs at least a part of the panoramic video. Thus, it is possible to present, to a user, information of the playback of the panoramic video (e.g., which display ranges the user was seeing, etc.).

6. Specific Process Example of Present Embodiment

Figure 29:
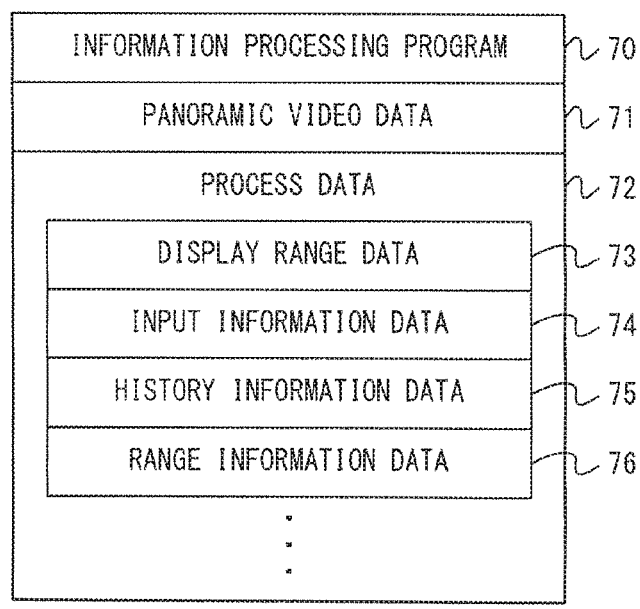
FIG. 29 shows an example of data stored in a storage unit of an information processing system in the present embodiment.

Referring to FIGS. 29 to 33, specific processes and operations of the information processing system 1 according to the present embodiment will now be described. FIG. 29 shows an example of data stored in a storage unit (the memory 6) of the information processing system 1 in the present embodiment. As shown in FIG. 29, the memory 6 of the information processing device 3 stores an information processing program 70, panoramic video data 71, and process data 72. Note that other than data shown in FIG. 29, the memory 6 may store operation data obtained from the terminal device 2, images to be output to display devices, image data used for generating such images, etc.

The information processing program 70 is a program to be executed by a computer (the CPU 5) of the information processing device 3. Note that the information processing program 70 is stored in a program storing unit (a storage device, a storage medium, or the like) that can be accessed by the information processing device 3 and that is provided inside or outside the information processing device 3. A part or whole of the information processing program 70 stored in the program storing unit is loaded and stored in the memory 6 at an appropriate point in time to be executed by the CPU 5. A part or whole of the information processing program 70 may be pre-stored (as a library, for example) in the information processing device for executing the information processing program 70.

The panoramic video data 71 represents panoramic video data to be played on the information processing system 1. The panoramic video data 71 includes data of a plurality of panoramic images of a panoramic video. Note that data of the object information and/or data of the additional information may be included in the panoramic video data 71.

The process data 72 is data used in an information process (FIGS. 30 to 33) to be performed by the CPU 5. The process data 72 includes display range data 73, input information data 74, history information data 75, and range information data 76.

The display range data 73 represents a display range determined in accordance with a user input. The display range data 73 may be information showing a position or range on a panoramic image, or may be information showing a vector representing the attitude of the virtual camera 22. The input information data 74 is data representing the input information, and for example includes the various information discussed in "(3-2) Storing additional information" (see FIG. 6). The history information data 75 is data representing the history information, and for example includes the various information discussed in "(5-1-1) Storing history information" (see FIG. 20). The range information data 76 is data representing the range information obtained while a panoramic video is played.

Next, a detailed flow of the information process according to the present embodiment will be described. In the present embodiment, upon start-up of the information processing system 1, the CPU 5 of the information processing device 3 initializes storage units such as the memory 6, and loads the information processing program 70 onto the memory 6 from the program storing unit. Then, the CPU 5 starts executing the information processing program 70.

Now, in the present embodiment, the information processing system 1 can play a panoramic video in four different playback modes as follows.

First playback mode: a playback mode in which inputs of additional information are accepted and history information is stored while a panoramic video is played.

Second playback mode: a playback mode in which additional information, guide information and history-related information are output while a panoramic video is played.

Third playback mode: a playback mode in which a panoramic video is played while determining a display range based on history information.

Fourth playback mode: a playback mode in which a panoramic video is played on two display devices, wherein the playback content of one display device is reflected in the playback on the other display device.

Which one of the first to fourth playback modes is executed may be determined in any manner, and may be determined by a selection by a user, for example. Note that the information processing system 1 may be capable of executing only one of the playback modes. Referring to FIGS. 30 to 33, the flow of a video playback process in each playback mode will now be described.

Note that the processes of steps in the flow charts shown in FIGS. 30 to 33 are merely an example, and the order of steps may be changed or other processes may be performed in addition to (or instead of) the processes of steps, as long as similar results are achieved. While it is assumed in the present embodiment that the processes of steps in the flow charts are performed by the CPU 5, the processes of some steps in the flow charts may be performed by a processor or a dedicated circuit other than the CPU 5.

(Playback Operation in First Playback Mode)

Figure 30:
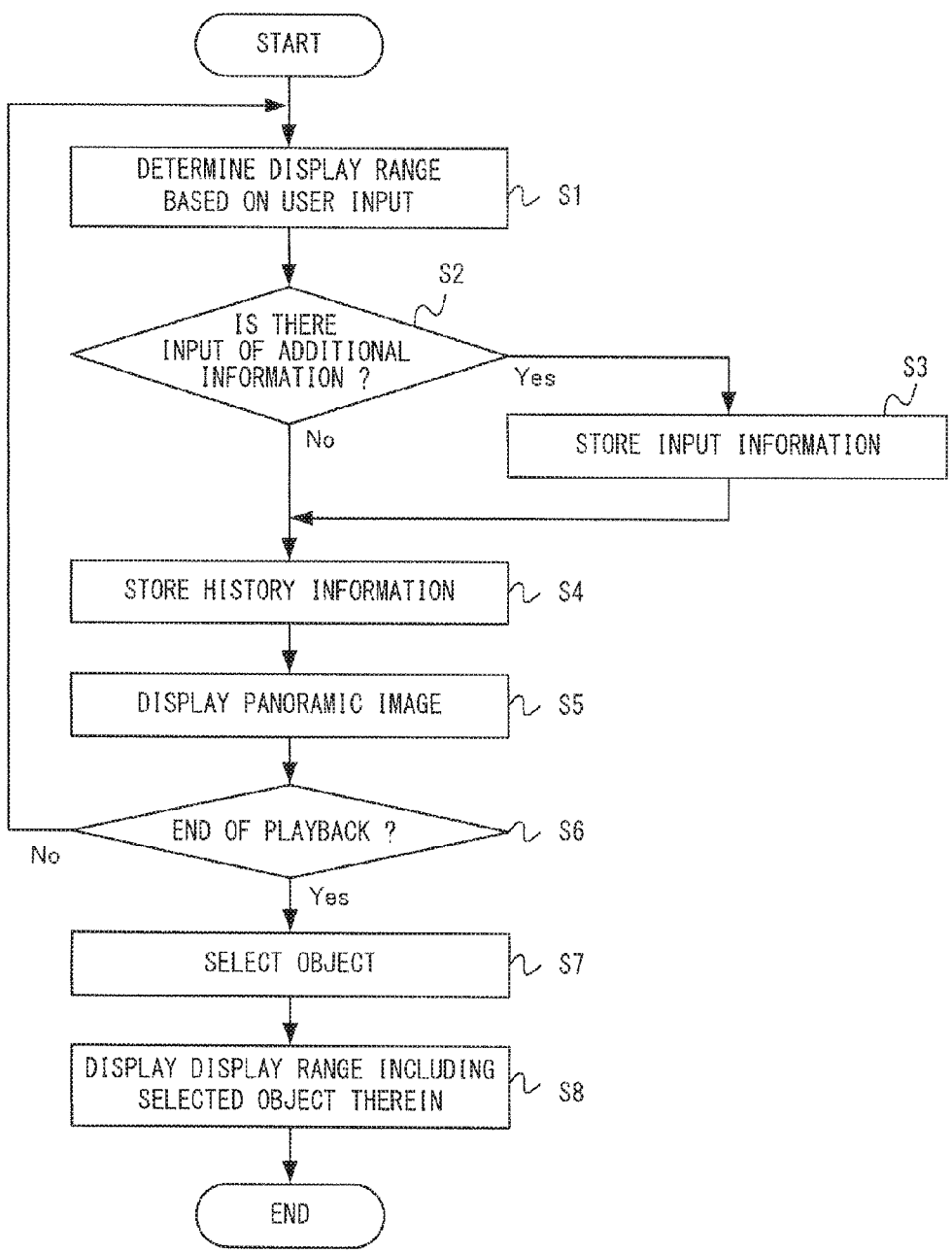
FIG. 30 is a flow chart showing an example of a flow of a video playback process in a first mode to be performed by a CPU of an information processing device in the present embodiment.

FIG. 30 is a flow chart showing an example of a flow of a video playback process in the first mode to be performed by the CPU 5 of the information processing device 3 in the present embodiment. When the first playback mode is selected to be executed, the CPU 5 performs the process shown in FIG. 30.

First, in step S1, the CPU 5 determines a display range based on an input made on the terminal device 2. The process of step S1 is performed by a method described above in "[2. Playback of panoramic video]", for example. Note that in step S1, the attitude of the terminal device 2 for determining a display range may be calculated in any manner. In the present embodiment, the CPU 5 obtains the detection result of the acceleration sensor 14 and/or the gyrosensor 15 from the terminal device 2, and calculates the attitude of the terminal device 2 based on the detection result. Data representing a display range determined based on the attitude of the terminal device 2 is stored in the memory 6 as the display range data 73.

In step S2, the CPU 5 obtains operation data from the terminal device 2, and determines whether there is an input of additional information (comment) based on the operation data. That is, the CPU 5 accepts an input of additional information (comment). An input of additional information is done by the method described above in "(3-1) Inputting additional information", for example. Where the determination result of step S2 is affirmative, the process of step S3 is performed. On the other hand, where the determination result of step S2 is negative, the process of step S4 is performed, skipping the process of step S3.

In step S3, the CPU 5 stores the input information data 74 in the memory 6. The input information is stored by the method described above in "(3-2) Storing additional information". As a specific process, the CPU 5 stores data representing the input information in the memory as the input information data 74.

In step S4, the CPU 5 stores the history information. The history information is stored by the method described above in "(5-1-1) Storing history information", for example. As a specific process, the CPU 5 reads out the history information data 75 stored in the memory 6, and adds the current time information and range information (display range data) to the history information represented by the history information data 75. Note that where the history information data 75 is not stored, data representing the current time information and range information (display range data) is stored in the memory as the history information data 75. The user information is added to the history information at any point in step S4 in the process loop of steps S1 to S6.

In step S5, the CPU 5 displays a panoramic image. In the present embodiment, a panoramic image is displayed both on the terminal device 2 and the monitor 4. Specifically, the CPU 5 reads out the panoramic video data 71 and the display range data 73 from the memory 6 to produce a panoramic image of a display range determined in step S1, among panoramic images associated with the current playback time point and output the produced panoramic image to the terminal device 2. Among panoramic images associated with the current playback time point, a panoramic image of a predetermined display range is generated and output to the monitor 4.

In step S6, the CPU 5 determines whether the playback of the panoramic video is ended. For example, the CPU 5 determines whether the panoramic video has been completely played to the end, and/or whether an instruction to end the playback has been given by a user. If the determination result from step S6 is negative, the process of step S1 is performed again. Thereafter, the series of processes of steps S1 to S6 is performed repeatedly until it is determined in step S6 that the playback should be ended. On the other hand, if the determination result from step S6 is affirmative, the process of step S7 is performed.

In step S7, the CPU 5 selects an object to be presented after the completion of playback based on history information. The selection of the object is done by a method described above in "(5-3) Output based on history information after completion of playback", for example. Note that the process of selecting an object to be presented may be performed during the playback of the panoramic video, as described above. In other embodiments, the CPU 5 may perform a process of selecting a display range based on history information instead of the process of selecting an object (or in addition to the process of selecting an object).

In step S8, the CPU 5 displays a panoramic image of a display range including the selected object therein on a display device. The display process in step S8 is performed by a method described above in "(5-3) Output based on history information after completion of playback", for example. After step S7, the CPU 5 ends the video playback process shown in FIG. 30.

Note that in other embodiments, in the video playback process in the first mode, only one of the process of accepting an input of additional information (steps S2 and S3) and the process of storing history information (step S4) may be performed. The process of outputting based on history information (steps S7 and S8) does not need to be performed.

(Playback Operation in Second Playback Mode)

Figure 31:
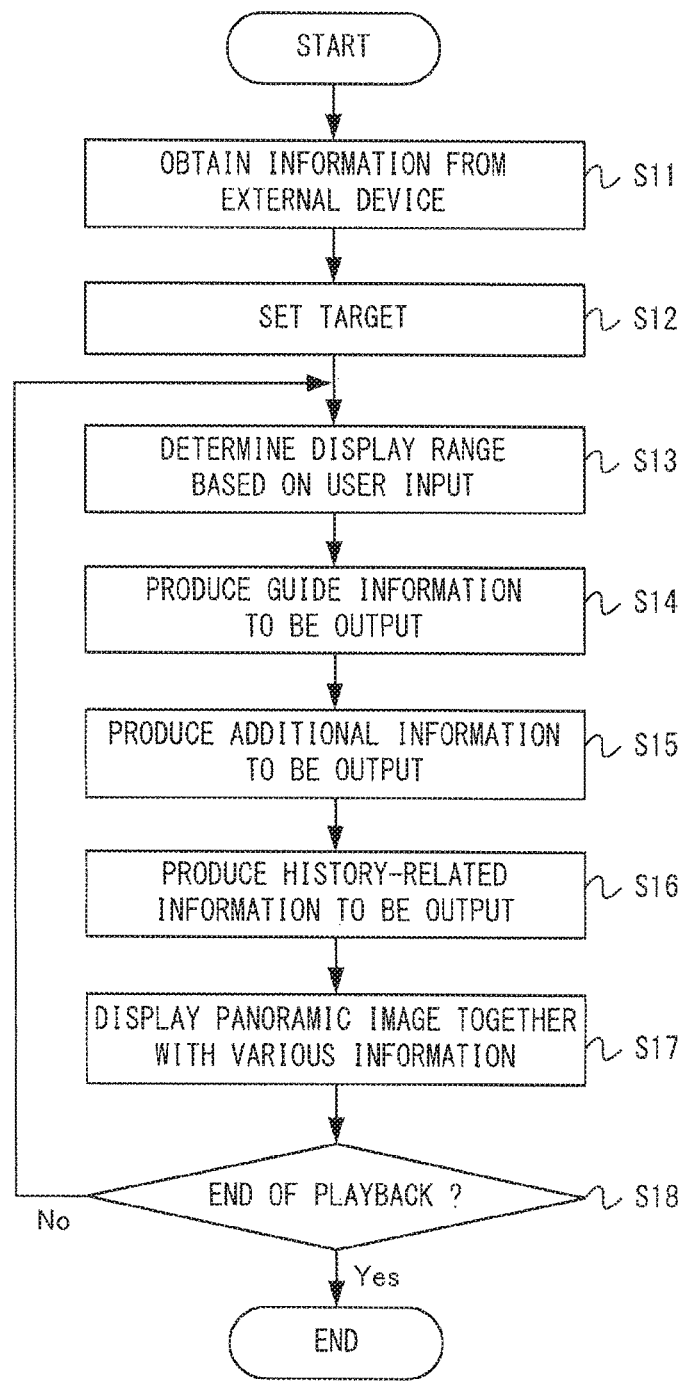
FIG. 31 is a flow chart showing an example of a flow of a video playback process in a second mode to be performed by a CPU of an information processing device in the present embodiment.

FIG. 31 is a flow chart showing an example of a flow of a video playback process in a second mode to be performed by the CPU 5 of the information processing device 3 in the present embodiment. When the second playback mode is selected to be executed, the CPU 5 performs the process shown in FIG. 31.

First, in step S11, the CPU 5 obtains various information from an external device. Various information refers to input information including additional information, and/or history information. The CPU 5 obtains various information by a method described above in "(3-4) Additional information from other users" and "(5-1-3) Obtaining history information", and stores it in the memory 6 as new pieces of the input information data 74 or the history information data 75.

In step S12, the CPU 5 sets a target. As described above in "(4-1) Setting target", for example, the position associated with the additional information set in the panoramic video to be played may be set as the target. The CPU 5 stores target information representing the set target. That is, the CPU 5 stores data representing target information in the memory 6 by a method described above in "(4-2) Storing target information".

In step S13, the CPU 5 determines a display range based on an input made on the terminal device 2. The process of step S13 is the same as the process of step S1 described above.

In step S14, the CPU 5 produces guide information to be output. That is, the CPU 5 reads out the input information data 74 and data representing the target information from the memory 6, and determines whether or not to output guide information based on the input information and the target information. This determination is made by a method described above in "(4-3) Method for determining output of guide information". If it is determined to output guide information, the CPU 5 produces an image (the guide image 41 shown in FIG. 17) representing guide information (and user information) by a method described above in "(4-4) Manner of outputting guide information", and determines the position on the screen at which to display the image.

In step S15, the CPU 5 produces additional information to be output. That is, the CPU 5 reads out the input information data 74 from the memory 6, and determines whether or not to output additional information based on input information. This determination is made by a method described above in "(3-3-1) Method for determining output of additional information". If it is determined to output additional information, an image (e.g., the comment image 32) representing additional information (and user information) is produced by a method described above in "(3-3-2) Manner of outputting additional information" and "(3-3-3) Output content of additional information", and the position on the screen at which to display the image is determined.

In step S16, the CPU 5 produces history-related information to be output. That is, the CPU 5 reads out the history information data 75 from the memory 6, and produces an image representing history-related information based on history information. The production of the image is done by a method described above in "(A) Method of outputting history-related information" of "(5-1-2) Playing panoramic video using history information". The CPU 5 also determines the position on the screen at which to display the image. Note that in other embodiments, in step S16, an auxiliary image described above in "(C) Method of displaying another image together with panoramic video" and "(5-1-2) Playing panoramic video using history information" may be produced. Then, in step S17, an auxiliary image is displayed together with the panoramic image.

In step S17, the CPU 5 displays images of the guide information, the additional information and the history-related information together with the panoramic image. Specifically, the CPU 5 reads out the panoramic video data 71 and the display range data 73 from the memory 6, and produces a panoramic image of a display range determined in step S13, of the panoramic image associated with the current playback time point. Then, the images produced in steps S14 to S16 are superimposed on the produced panoramic image, and the produced image is output to the terminal device 2. Note that in step S17, the process of displaying a panoramic video on the monitor 4 is the same as step S5 described above.

In step S18, the CPU 5 determines whether or not to end the playback of the panoramic video by a method similar to step S6. If the determination result from step S18 is negative, the process of step S13 is performed again. On the other hand, if the determination result from step S18 is affirmative, the CPU 5 ends the video playback process shown in FIG. 31. Thereafter, the series of processes of steps S13 to S18 is performed repeatedly until it is determined in step S18 that the playback should be ended.

Note that in other embodiments, in the video playback process in the second mode, only some of the various information (additional information, guide information, and history-related information) may be output. For example, in the video playback process in the second mode, only the process of outputting additional information (step S14), only the processes of outputting additional information and guide information (steps S14 and S15), or only the process of outputting history-related information (step S16) may be performed, of the processes of outputting various information (steps S14 to S16).

(Playback Operation in Third Playback Mode)

Figure 32:
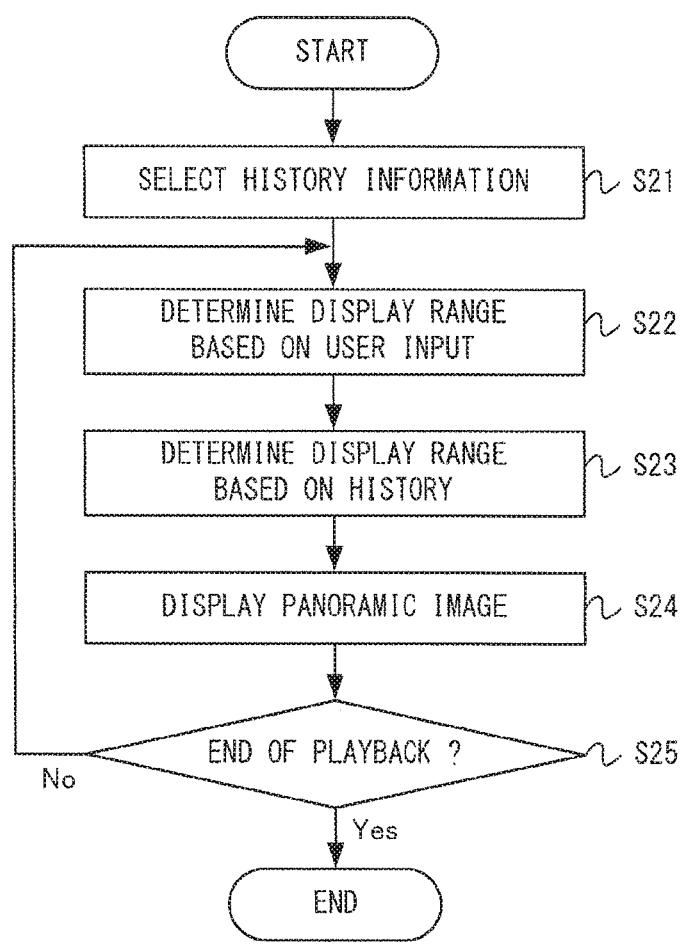
FIG. 32 is a flow chart showing an example of a flow of a video playback process in a third mode to be performed by a CPU of an information processing device in the present embodiment.

FIG. 32 is a flow chart showing an example of a flow of a video playback process in the third mode to be performed by the CPU 5 of the information processing device 3 in the present embodiment. When the third playback mode is selected to be executed, the CPU 5 performs the process shown in FIG. 32.

First, in step S21, the CPU 5 selects history information to be used for determining a display range. The history information may be selected by any method, and is selected following a user instruction, for example.

In step S22, the CPU 5 determines a display range based on an input made on the terminal device 2. The display range determined in step S22 is the display range of the panoramic video to be displayed on the terminal device 2. The process of step S22 is the same as the process of step S1 described above.

In step S23, the CPU 5 determines a display range based on history information selected in step S21. The display range determined in step S22 is the display range of the panoramic video displayed on the monitor 4. That is, the CPU 5 reads out the history information data 75 representing the selected history information from the memory 6, and determines the display range by a method described above in "(5-2-2) Playing panoramic video using range information". The CPU 5 stores data representing the determined display range in the memory 6 as the display range data 73.

In step S24, the CPU 5 displays a panoramic image. Specifically, the CPU 5 reads out the panoramic video data 71 and the display range data 73 from the memory 6, and produces a panoramic image of a display range determined in step S23, of the panoramic image associated with the current playback time point, to output the panoramic image to the monitor 4. Then, the panoramic image of the display range based on history information may be displayed in a part of the screen area of the monitor 4 as shown in FIG. 24. Note that the process of displaying a panoramic video on the terminal device 2 in step S24 is the same as step S5 described above.

Note that in other embodiments, in the video playback process in the third mode, some of the process of accepting an input of additional information (steps S2 and S3) and the process of storing history information (step S4) may be performed. In the video playback process in the third mode, some of the processes of outputting various information such as additional information (steps S14 to S16) may be performed.

(Playback Operation in Fourth Playback Mode)

Figure 33:
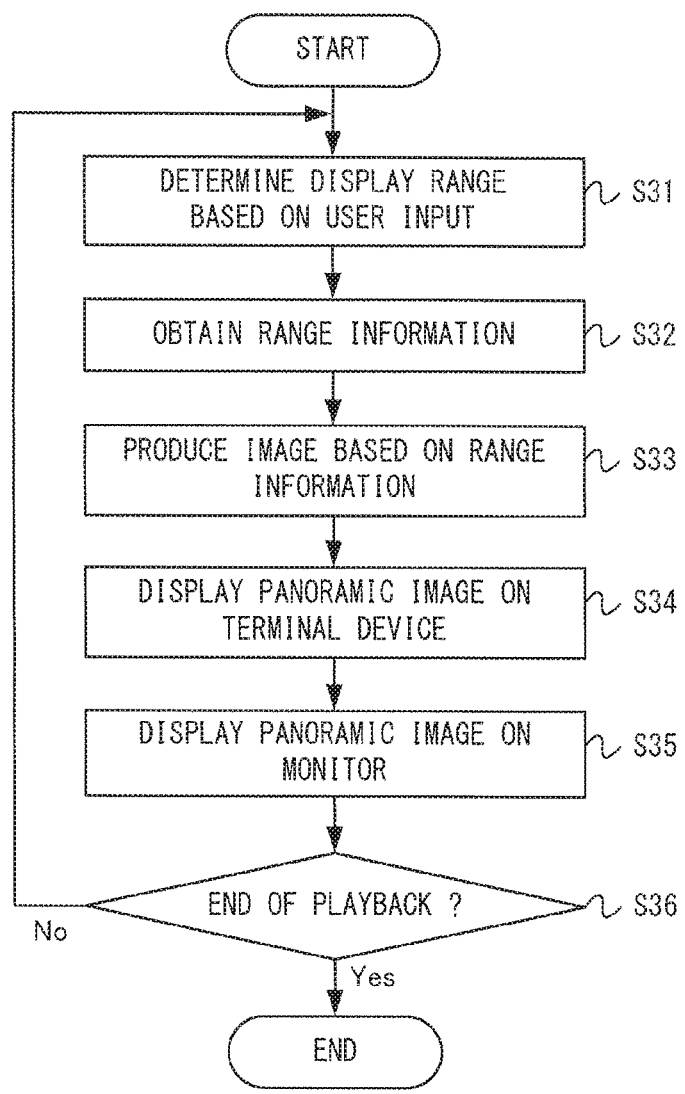
FIG. 33 is a flow chart showing an example of a flow of a video playback process in a third mode to be performed by a CPU of an information processing device in the present embodiment.

FIG. 33 is a flow chart showing an example of a flow of a video playback process in the fourth mode to be performed by the CPU 5 of the information processing device 3 in the present embodiment. When the fourth playback mode is selected to be executed, the CPU 5 performs the process shown in FIG. 33.

First, in step S31, the CPU 5 determines a display range based on an input made on the terminal device 2. The process of step S31 is the same as the process of step S1 described above.

In step S32, the CPU 5 obtains range information. For example, the CPU 5 obtains range information representing the display range determined in step S31 described above. The range information may be obtained by a method described above in "(5-2-1) Obtaining range information", for example. Data representing the obtained range information is stored in the memory 6 as the range information data 76.

In step S33, the CPU 5 produces an image based on the range information (an image reflecting the playback content of the terminal device 2) to be output together with the panoramic video. That is, the CPU 5 reads out the range information data 76 from the memory 6, and produces the image based on the range information. For example, an image described above in "(5-2-2) Playing panoramic video using range information" is produced.

In step S34, the CPU 5 displays a panoramic video on the terminal device 2. Note that the process of displaying a panoramic video on the terminal device 2 is the same as step S5 described above.

In step S35, the CPU 5 displays a panoramic video on the monitor 4 while changing the output content thereof in accordance with the range information. Specifically, the CPU 5 displays the image produced in step S33 together with the panoramic image on the monitor 4. Thus, an image reflecting the playback content of the terminal device 2 described above in "(5-2-1) Obtaining range information" is displayed on the monitor 4. Note that the method of producing and displaying a panoramic image in step S35 is the same as step S5 described above.

In step S36, the CPU 5 determines whether or not to end the playback of the panoramic video by a method similar to step S6. If the determination result from step S36 is negative, the process of step S31 is performed again. On the other hand, if the determination result from step S36 is affirmative, the CPU 5 ends the video playback process shown in FIG. 33. Thereafter, the series of processes of steps S31 to S36 is performed repeatedly until it is determined in step S36 that the playback should be ended.

Note that in other embodiments, some processes of the first to fourth playback modes may be performed at the same time (in one playback mode). For example, in the fourth playback mode, the process of inputting various information of the first playback mode (steps S2 to S4) may be performed, or the process of outputting various information of the second playback mode (steps S13 to S16) may be performed. Processes to be performed by the information processing device 3 are as described above.

The systems, devices and apparatuses described herein may include one or more processors, which may be located in one place or distributed in a variety of places communicating via one or more networks. Such processor(s) can, for example, use conventional 3D graphics transformations, virtual camera and other techniques to provide appropriate images for display. By way of example and without limitation, the processors can be any of: a processor that is part of or is a separate component co-located with the stationary display and which communicates remotely (e.g., wirelessly) with the movable display; or a processor that is part of or is a separate component co-located with the movable display and communicates remotely (e.g., wirelessly) with the stationary display or associated equipment; or a distributed processing arrangement some of which is contained within the movable display housing and some of which is co-located with the stationary display, the distributed portions communicating together via a connection such as a wireless or wired network; or a processor(s) located remotely (e.g., in the cloud) from both the stationary and movable displays and communicating with each of them via one or more network connections; or any combination or variation of the above.

The processors can be implemented using one or more general-purpose processors, one or more specialized graphics processors, or combinations of these. These may be supplemented by specifically-designed ASICs (application specific integrated circuits) and/or logic circuitry. In the case of a distributed processor architecture or arrangement, appropriate data exchange and transmission protocols are used to provide low latency and maintain interactivity, as will be understood by those skilled in the art.

Similarly, program instructions, data and other information for implementing the systems and methods described herein may be stored in one or more on-board and/or removable memory devices. Multiple memory devices may be part of the same device or different devices, which are co-located or remotely located with respect to each other.

As described above, the present embodiment is applicable to an information processing system or an information processing program, with the aim of, for example, presenting more information to the user when displaying a panoramic image.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. A non-transitory computer-readable storage medium comprising an information processing program to be executed by a computer of an information processing device for displaying a virtual image on a first display device, wherein the information processing program instructs the computer to:
   obtain range information enabling identification of a display range and/or enabling identification of a position within the display range, wherein the display range is determined based on an input made on a predetermined input device in an environment where it is possible to obtain a virtual image regarding a virtual world having a range wider than a range to be displayed on a second display device, and where it is possible to display the virtual image on the second display device, and wherein the range information indicates history of a display range that has been displayed; and
   output the virtual image to the first display device while changing output content thereof in accordance with the obtained range information indicating the history of the display range that has been displayed, wherein
   the obtained range information is stored in a storage device as history information indicating the history of the display range that has been displayed,
   information based on the history information is output after the history information is stored, and
   the history information stored in the storage device is information, in which time information enabling identification of a time in the virtual image is associated with range information enabling identification of a display range at the time and/or a position within the display range.

2. The non-transitory computer-readable storage medium according to claim 1, wherein
   the information processing program further instructs the computer to determine a display range of a virtual image in the first display device based on a user input; and
   the virtual image of the display range determined based on the user input is displayed on the first display device, and history-related information produced based on the history information is output.

3. The non-transitory computer-readable storage medium according to claim 2, wherein the history-related information output together with the virtual image represents a direction of the display range identified by the range information included in the history information with respect to a current display range in the first display device.

4. The non-transitory computer-readable storage medium according to claim 2, wherein the output history-related information represents a display frequency for a predetermined range in the virtual image obtained from the history information.

5. The non-transitory computer-readable storage medium according to claim 4, wherein the history-related information represents a display frequency determined in accordance with the number of pieces of history information that satisfy a predetermined condition regarding the time information and the range information.

6. The non-transitory computer-readable storage medium according to claim 1, wherein when display of the virtual image is completed on the second display device, a virtual image of a display range determined based on the range information stored as the history information during the display is displayed on the first display device as a still image or a video.

7. The non-transitory computer-readable storage medium according to claim 6, wherein
   range information representing the display range and/or a position within the display range is obtained as the history information;
   the information processing program further instructs the computer to determine whether or not an object appearing in the virtual image is included in a display range identified by the history information so as to select an object to be output based on a result of the determination; and
   a virtual image including the selected object therein is displayed on the first display device as a still image or a video.

8. The non-transitory computer-readable storage medium according to claim 6, wherein
   the information processing program further instructs the computer to determine whether or not an object is included within a display range during display of the virtual image on the second display device so as to select an object to be output based on a result of the determination;
   information representing the selected object is obtained as the range information; and
   a virtual image of a display range including therein the object represented by the range information is displayed on the first display device as a still image or a video.

9. The non-transitory computer-readable storage medium according to claim 6, wherein
   a virtual image of a display range, determined based on a plurality of pieces of history information, is displayed on the first display device as a still image or a video.

10. The non-transitory computer-readable storage medium according to claim 1, wherein the second display device is the same as the first display device.

11. The non-transitory computer-readable storage medium according to claim 1, wherein the second display device is different from the first display device.

12. The non-transitory computer-readable storage medium according to claim 11, wherein the information processing program further instructs the computer to:
   determine the display range based on an input made on the predetermined input device while the virtual image is displayed on the second display device; and
   display the virtual image of the determined display range on the first display device while the virtual image is displayed on the second display device.

13. The non-transitory computer-readable storage medium according to claim 1, wherein a virtual image of a display range determined based on the range information is displayed on the first display device.

14. The non-transitory computer-readable storage medium according to claim 13, wherein:
   range information regarding a virtual image displayed on a second display device different from the first display device is obtained; and
   the virtual image is displayed on the first display device while reducing a change in the display range determined based on the range information.

15. The non-transitory computer-readable storage medium according to claim 1, wherein:

the obtained range information represents a position specified by a user while the virtual image is displayed on the second display device; and an image representing a position on a virtual image determined based on the range information is displayed on the first display device together with the virtual image.

16. The non-transitory computer-readable storage medium according to claim 1, wherein an image representing a viewing direction corresponding to a display range or a position based on the range information is displayed on the first display device.

17. The non-transitory computer-readable storage medium according to claim 1, wherein an image representing a space represented by the virtual image and a position in the space corresponding to a position on the virtual image based on the range information is displayed on the first display device.

18. The non-transitory computer-readable storage medium according to claim 1, wherein the range information is obtained from an external device via a network.

19. The non-transitory computer-readable storage medium according to claim 1, wherein:
user information representing a user who has made an input regarding the range information is further obtained; and
the user information is output when the virtual image is output.

20. An information processing device comprising at least one processor and configured to display a virtual image on a first display device, the at least one processor controlling the information processing device to:
obtain range information enabling identification of a display range and/or enabling identification of a position within the display range, wherein the display range is determined based on an input made on a predetermined input device in an environment where it is possible to obtain a virtual image regarding a virtual world having a range wider than a range to be displayed on a second display device, and where it is possible to display the virtual image on the second display device, and wherein the range information indicates history of a display range that has been displayed; and
output the virtual image to the first display device while changing output content thereof in accordance with the obtained range information indicating the history of the display range that has been displayed, wherein
the obtained range information is stored in a storage device as history information indicating the history of the display range that has been displayed,
information based on the history information is output after the history information is stored, and
the history information stored in the storage device is information, in which time information enabling identification of a time in the virtual image is associated with range information enabling identification of a display range at the time and/or a position within the display range.

21. An information processing system for displaying a virtual image on a first display device, the information processing system comprising:
a processing system having at least one processor, the processing system configured to:
obtain range information enabling identification of a display range and/or enabling identification of a position within the display range, wherein the display range is determined based on an input made on a predetermined input device in an environment where it is possible to obtain a virtual image regarding a virtual world having a range wider than a range to be displayed on a second display device, and where it is possible to display the virtual image on the second display device, and wherein the range information indicates history of a display range that has been displayed; and
output the virtual image to the first display device while changing output content thereof in accordance with the obtained range information indicating the history of the display range that has been displayed, wherein
the obtained range information is stored in a storage device as history information indicating the history of the display range that has been displayed,
information based on the history information is output after the history information is stored, and
the history information stored in the storage device is information, in which time information enabling identification of a time in the virtual image is associated with range information enabling identification of a display range at the time and/or a position within the display range.

22. An image display method for displaying a virtual image on a first display device, comprising:
obtaining range information enabling identification of a display range and/or enabling identification of a position within the display range, wherein the display range is determined based on an input made on a predetermined input device in an environment where it is possible to obtain a virtual image regarding a virtual world having a range wider than a range to be displayed on a second display device, and where it is possible to display the virtual image on the second display device, and wherein the range information indicates history of a display range that has been displayed; and
outputting the virtual image to the first display device while changing output content thereof in accordance with the obtained range information indicating the history of the display range that has been displayed, wherein
the obtained range information is stored in a storage device as history information indicating the history of the display range that has been displayed,
information based on the history information is output after the history information is stored, and
the history information stored in the storage device is information, in which time information enabling identification of a time in the virtual image is associated with range information enabling identification of a display range at the time and/or a position within the display range.

* * * * *